US009927005B2

(12) United States Patent
Hvass et al.

(10) Patent No.: US 9,927,005 B2
(45) Date of Patent: Mar. 27, 2018

(54) TWO-STAGE HYPOCYCLOIDAL GEAR TRAIN

(71) Applicant: Southwest Research Institute, San Antonio, TX (US)

(72) Inventors: Paul B. Hvass, San Antonio, TX (US); Glynn R. Bartlett, Boerne, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 15/222,320

(22) Filed: Jul. 28, 2016

(65) Prior Publication Data

US 2017/0045118 A1     Feb. 16, 2017

Related U.S. Application Data

(60) Provisional application No. 62/203,261, filed on Aug. 10, 2015.

(51) Int. Cl.
*F16H 1/32*     (2006.01)
(52) U.S. Cl.
CPC ......... *F16H 1/32* (2013.01); *F16H 2001/324* (2013.01)
(58) Field of Classification Search
CPC ............................ F16H 1/32; F16H 2001/324
See application file for complete search history.

(56) References Cited

U.S. PATENT DOCUMENTS

| 1,514,938 A | 11/1924 | Taub |
|---|---|---|
| 2,170,951 A | 8/1939 | Perry |
| 2,666,345 A | 1/1954 | Amberg |
| 3,307,434 A | 3/1967 | Kope |
| 3,955,445 A | 5/1976 | Osterwalder |
| 4,050,331 A | 9/1977 | Braren |
| 4,348,918 A | 9/1982 | Fukui |

(Continued)

FOREIGN PATENT DOCUMENTS

| DE | 298 14 294 U1 | 1/1999 |
|---|---|---|
| DE | 197 34 536 A1 | 2/1999 |

(Continued)

OTHER PUBLICATIONS

Colbourne, J.R.: "The Geometric Design of Internal Gear Pairs", Gear Technology, May/Jun. 1990, pp. 28-37.

(Continued)

*Primary Examiner* — Jacob S. Scott
*Assistant Examiner* — Tinh Dang
(74) *Attorney, Agent, or Firm* — Grossman, Tucker et al.

(57) ABSTRACT

A gear train including a rotatable drive shaft and a clutch roller in rotatable contact with the drive shaft or mounted on the drive shaft. A first wobble gear and a second wobble gear are suspended around the drive shaft, wherein the first wobble gear is affixed to and concentric with the second wobble gear and the clutch roller is preloaded against the first and second wobble gears. A first ring gear surrounding and engaged by the first wobble gear; and a second ring gear surrounding and engaged by the second wobble gear. The ring gears being coaxial and rotatable relative to one another. The drive shaft rotates the clutch roller, which drives the first and second wobble gears, such that the wobble gears rotate around the drive shaft and at least one of the first and second ring gears rotate around the common axis.

47 Claims, 20 Drawing Sheets

(56) References Cited

U.S. PATENT DOCUMENTS

| | | |
|---|---|---|
| 4,379,976 A | 4/1983 | Pitchford et al. |
| 4,512,213 A | 4/1985 | Newton |
| 4,643,047 A | 2/1987 | Distin et al. |
| 4,829,851 A | 5/1989 | Imase |
| 4,898,065 A | 2/1990 | Ogata et al. |
| 5,080,638 A | 1/1992 | Osborn |
| 5,123,882 A | 6/1992 | Baranyi |
| 5,209,637 A | 5/1993 | Reubeuze |
| 5,398,904 A | 3/1995 | Rees |
| 5,401,220 A | 3/1995 | Heller |
| 5,498,215 A | 3/1996 | Hosokawa et al. |
| 5,616,095 A * | 4/1997 | Pruitt .................. B25B 17/02 475/178 |
| 5,689,891 A * | 11/1997 | Bednar ................ B23D 49/162 30/392 |
| 5,707,310 A | 1/1998 | Maeguchi et al. |
| 6,805,650 B2 | 10/2004 | Branov et al. |
| 7,431,676 B2 * | 10/2008 | Tesar .................. B64C 13/34 475/163 |
| 7,963,878 B2 | 6/2011 | Nardelli |
| 8,033,942 B2 * | 10/2011 | Tesar ..................... F16H 1/28 475/163 |
| 8,298,110 B2 | 10/2012 | Schuler |
| 8,936,525 B2 * | 1/2015 | Shimada ............. B60K 7/0007 475/149 |
| 9,469,334 B2 * | 10/2016 | Ko ...................... B62D 5/0403 |
| 9,581,220 B2 * | 2/2017 | Kim ..................... B25J 9/1025 |
| 2007/0060440 A1* | 3/2007 | Lee ...................... B62M 6/40 475/337 |
| 2011/0009232 A1 | 1/2011 | Kapelevich |
| 2011/0190090 A1 | 8/2011 | Freund |
| 2011/0319217 A1* | 12/2011 | Imase ................... F16H 1/32 475/168 |
| 2012/0286629 A1 | 11/2012 | Johnson et al. |
| 2014/0148302 A1 | 5/2014 | Gieb et al. |
| 2014/0228162 A1 | 8/2014 | Tesar |

FOREIGN PATENT DOCUMENTS

| | | |
|---|---|---|
| EP | 0 108 841 A1 | 5/1984 |
| EP | 0 077 490 B1 | 1/1988 |
| EP | 0 482 529 A1 | 4/1992 |
| EP | 0 286 760 B1 | 7/1992 |
| EP | 0 710 782 A1 | 5/1996 |
| EP | 1574748 A1 | 9/2005 |
| EP | 1 827 938 B1 | 2/2009 |
| EP | 2 532 927 B1 | 3/2014 |
| WO | 2004048824 A3 | 6/2004 |

OTHER PUBLICATIONS

Logue, C.H: American Machinist Gear Book, in particular, Section X "Intermittent Gears," book pp. 252 to 268, and Section XV, The Williams System of Internal Gearing, book pp. 320-333 (374 pgs. total).

Maiti, R., et al: "Minimum Toioth Difference in Internal-External Involute Gear Pair," Science Direct, Mechanism and Machine Theory, vol. 31, Issue 4, May 1996, pp. 475-485; Abstract Only.

Park, Sang-Hyun: Thesis 2005: "Fundamental Development of Hypocycloidal Gear Transmissions"; Dissertation, University of Texas at Austin (448 pgs).

NASA Gear Bearings: Featured Technologies—Gear Bearings: "Increased Capacity and Performance with Reduced Size, Weight and Cost for Superior Gear Drives"; <<http://techtransfer.gsfc.nasa.gov/ft_tech_gear_bearings.shtm.>> (accessed Nov. 8, 2017. 4 pgs).

Harmonic Drive: You Tube video uploaded by Harmonic Drive AG, Published on Oct. 26, 2011, 2:30 min https://www.youtube.com/watch?v=bzRh672peNk.

Nabtesco: You Tube video uploaded by RAVEO s.r.o. ; Published on Jul. 4, 2013, 2:27 min https://www.youtube.com/watch?v=Ec2eJdQ0KOM.

Simaco (Russian): You Tube video uploaded by Сибирский Машиностроительный Комбинат stepavancouver, Published on Sep. 1, 2011, 4:22 min http://youtu.be/Gm940RA-hM.

Spinea Twin Spin: You Tube video uploaded by SPINEA Gears, Published on Mar. 23, 2014, 2:33 min https://www.youtube.com/watch?v=hQVL-G50T2Q.

Sumitomo: You Tube video uploaded by stefanieb5739, Published on Jan. 16, 2008, 1:51 min http://youtu.be/EFni742pEXI.

* cited by examiner

TWO-STAGE HYPOCYCLOIDAL GEAR TRAIN

CROSS-REFERENCE TO RELATED APPLICATIONS

The present application claimed the benefit of the filing date of U.S. Provisional Application No. 62/203,261, filed on Aug. 10, 2015, the teachings of which are incorporated herein by reference.

FIELD OF INVENTION

The present disclosure relates to gear trains and, in particular, two-stage hypocycloidal gear trains.

BACKGROUND

Robotics, prosthetic devices and other assistive devices use high reduction ratio gear trains, with gear ratios typically in the range of 10:1 to 1000:1 to convert relatively high motor speeds at relatively low torque, to lower speeds at relatively higher torque. This may be accomplished using harmonic drives, cycloid drives, planetary drives, or worm drives. However, these gear trains are often relatively heavy and expensive to manufacture. In some instances, the gear train of a single joint of a human scale robot weighs as much as 5 pounds and cost hundreds, if not thousands, of dollars. Such heavy-weight gear trains may make robot arms and assistive devices unsafe when operating at high speeds around humans due to their kinetic energy. Robots must often be kept in safety cages or behind fences, separated from people. In the case of prosthetic and assistive devices, the added expense limits access to the technology and the weight limits design flexibility.

Accordingly, there remains the need to develop gear trains that are relatively inexpensive to produce and are torque-limited to enable humans and robots to work together. Weight reduction is also desirable to increase robot payload, or to reduce energy consumption and user fatigue when incorporated into prosthetic and assistive devices.

SUMMARY

An aspect of the present disclosure relates to a gear train including a rotatable drive shaft and a clutch roller in rotatable contact with the drive shaft or mounted on the drive shaft. The gear train also includes a first wobble gear and a second wobble gear suspended around the drive shaft, wherein the first wobble gear is affixed to the second wobble gear and the clutch roller is preloaded against the first and second wobble gears. In addition, the gear train includes a first ring gear surrounding and engaged by the first wobble gear; and a second ring gear surrounding and engaged by the second wobble gear. The ring gears share a common axis and are rotatable relative to one another. The drive shaft rotates the clutch roller and the clutch roller drives the first and second wobble gears, such that the wobble gears rotate around the drive shaft and at least one of the first and second ring gears rotate around the common axis, which results in a speed reduction from the drive shaft to one or both of the ring gears. In addition, the clutch roller deforms and slips upon application of a torque to said clutch roller greater than a rated torque. In embodiments, the rated torque is in the range of 50 N-m to 200 N-m and the clutch roller exhibits a durometer in the range of 30 to 100 on the Shore A scale.

In particular embodiments, the clutch roller is in rotatable contact with the drive shaft, the clutch roller engages the first wobble gear with the first ring gear and the second wobble gear with the second ring gear, and the clutch roller deforms and slips relative to at least one of the rotatable drive shaft and the wobble gears upon application of a torque to the clutch roller greater than a rated torque.

In additional particular embodiments, the clutch roller is mounted to the drive shaft, and the gear train further comprises a planetary shaft that maintains engagement of the first and second wobble gears with the first and second ring gears, and the clutch roller deforms and slips relative to the wobble gears upon application of a torque to the clutch roller greater than a rated torque.

A further aspect of the present disclosure relates to a method of operating a gear train. The method includes rotating a drive shaft around a primary axis at a first rate of rotation, and rotating a clutch roller with the drive shaft, wherein the clutch roller is preloaded against a first wobble gear and a second wobble gear. In addition, the method includes driving the first wobble gear and the second wobble gear with the clutch roller, rotating the wobble gears around the drive shaft, wherein the first wobble gear engages a first ring gear and the second wobble gear engages a second ring gear. The method also includes rotating at least one of the first ring gear and the second ring gear around the primary axis at a second rate of rotation that is less than the first rate of rotation. The clutch roller deforms and slips upon application of a torque to the clutch roller greater than a rated torque.

In particular embodiments, the method includes orbiting the clutch roller around the primary axis and rotating the clutch roller around a secondary axis in a direction opposite to the first direction; wherein upon application of a torque to the clutch roller greater than a rated torque the clutch roller deforms and slips relative to at least one of the drive shaft and the wobble gears.

In additional particular embodiments, the clutch roller is mounted on the drive shaft and rotates around the primary axis, and the method further comprises orbiting a planetary shaft around the drive shaft to maintain engagement of the first wobble gear and the second wobble gear with the first ring gear and the second ring gear, wherein upon application of a torque to the clutch roller greater than a rated torque the clutch roller deforms and slips relative to the wobble gears.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
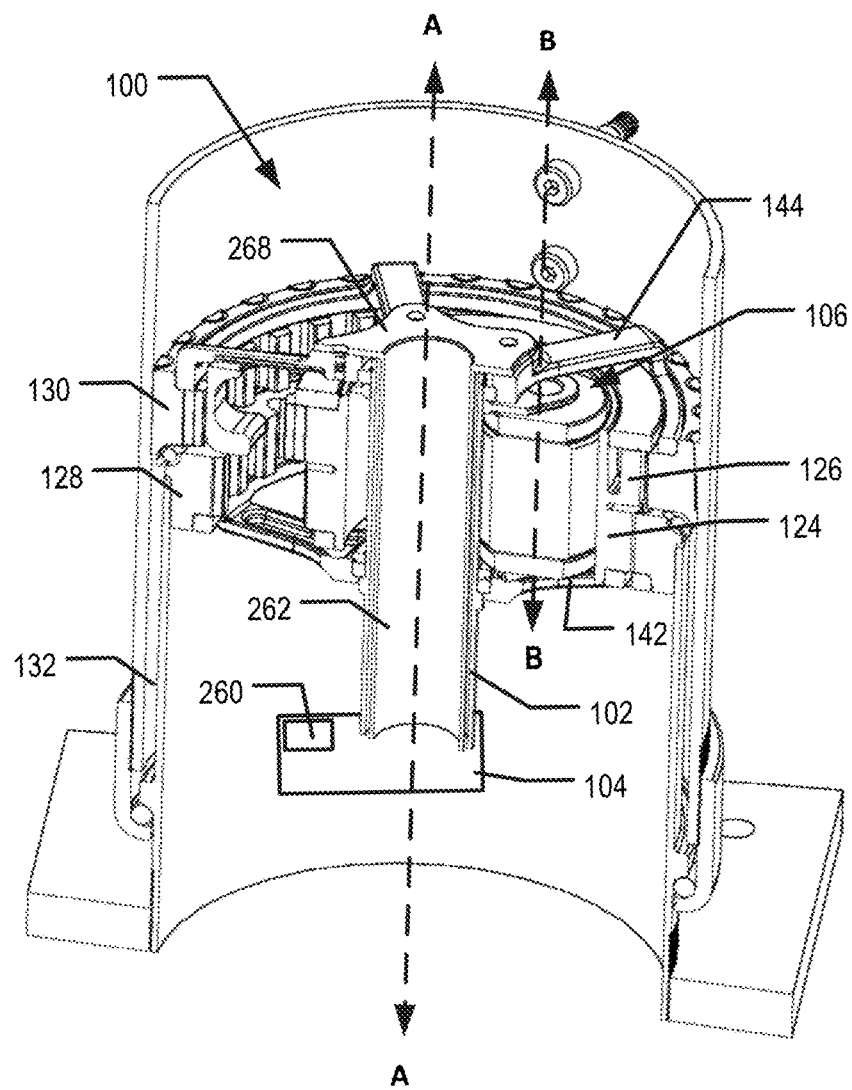
FIG. 1 illustrates a cross-section of an embodiment of a gear train.

The present disclosure is directed to gear trains. In particular, two-stage hypocycloidal gear trains as well as a method of operating such gear trains. More particularly, the gear trains discussed herein include coplanar dual stage hypocycloidal wobble gear trains. The gear trains described herein include a planetary traction drive that includes a clutch, which slips against adjacent surfaces if a level of torque greater than the rated torque is exerted on the clutch roller. In addition, the gear trains discussed herein utilize rolling rings to maintain the gear mesh on respective pitch circles and rolling contact under preload. Further, the gear trains provide a counterweight arrangement that makes use of an interstitial gap provided between the second stage gears. The part count, i.e., the number of components forming the gear train, is relatively low compared to other hypocycloidal gear train designs.

A gear train, as described herein, may be incorporated at joints in robotic assemblies, prosthetic devices or assistive devices. The joint arms may move clockwise, counterclockwise or both, relative to the axis of rotation, depending on the drive mechanism selected. Further, the gear train may provide a transmission ratio in the range of 10:1 to 1000:1, including all values and ranges therein, through the use of a two stage design. The first stage, a planetary traction drive, may provide a gear ratio in the range of 1:1 to 10:1, and the second stage, a dual planocentric hypocycloidal gear train, may provide a gear ratio in the range of, for example, 10:1 to 100:1 and preferably in the range of 32:1 to 40:1. Depending on the desired operating conditions, peak output speed may be in the range of 0.5 revolutions per second to 5 revolutions per second. In addition, the peak output torque is preferably at least 50 N-m, such as in the range of 50 N-m to 200 N-m (Newton-meters), including all values and ranges therein, such as 50 N-m to 100 N-m, 150 N-m to 200 N-m, etc. In embodiments, upon application of a torque of greater than the rated torque, i.e., peak output torque, the clutch roller may deform causing slippage of the clutch roller relative to the drive shaft or wobble gears as explained further below. Thus, the rated torque is understood to be the peak output torque that the clutch roller may withstand without slippage and the torque value at which slippage occurs may be adjusted based on the durometer characteristics and spring constant of the materials chosen for the clutch roller. In particular embodiments, the rated torque may be 50 N-m or greater, such as in the range of 50 N-m to 200 N-m. Slippage of the clutch may prevent further rotation of the output of the gear train, for so long as the torque is exceeded. Once torques at or lower than the peak torque is restored rotation may begin again.

The gear train includes a rotatable drive shaft, a clutch roller, a set of wobble gears, and a set of ring gears. The gear train also preferably includes a counterweight, a first spoke ring, and a second spoke ring. The gear train further preferably includes bearings and rolling rings positioned between moving or contacting components. These components, as well as additional components, will be discussed in further detail herein.

Turning to FIG. 1, which illustrates an exemplary embodiment, the gear train is preferably operated by rotating a drive shaft 102 by a motor 104 that is affixed to the drive shaft. The motor may be directly coupled to the drive shaft or indirectly coupled to the drive shaft through the use of, for example, a chain or belt. The drive shaft is rotated by the motor in one direction (clockwise or counterclockwise around the primary axis of rotation A-A) or, alternatively, in both directions (clockwise and counterclockwise around the primary axis of rotation A-A). The input speed of the drive shaft is preferably in the range of 1,000 rpm (rotations per minute) to 10,000 rpm, including all values and ranges therein, such as 7,000 to 8,000 rpm, and preferably 7,500 rpm.

In embodiments, the drive shaft is hollow to provide access to communication bus cables or other lines. In addition, the drive shaft is preferably formed from aluminum 6061-T6. However, other materials may be used. In non-limiting embodiments, the drive shaft materials exhibit a density in the range of 2.50 g/cc (grams per cubic centimeter) to 3.0 g/cc, a tensile strength (yield) of at least 0.2 GPa, such as in the range of 0.2 to 0.5 GPa, including all values and ranges therein, and a young's modulus in the range of 6 GPa to 60 GPa, including all values and ranges therein, may be employed. The drive shaft may be formed by a number of processes, depending in part on material selection, such as by lathe, extrusion, grinding, etc. In preferred embodiments, the diameter of the drive shaft may be in the range of 10.0 to 50.0 mm, including all values and ranges therein, such as 20.0 to 40.0 mm, 30.0 mm, etc.

Figure 2A:
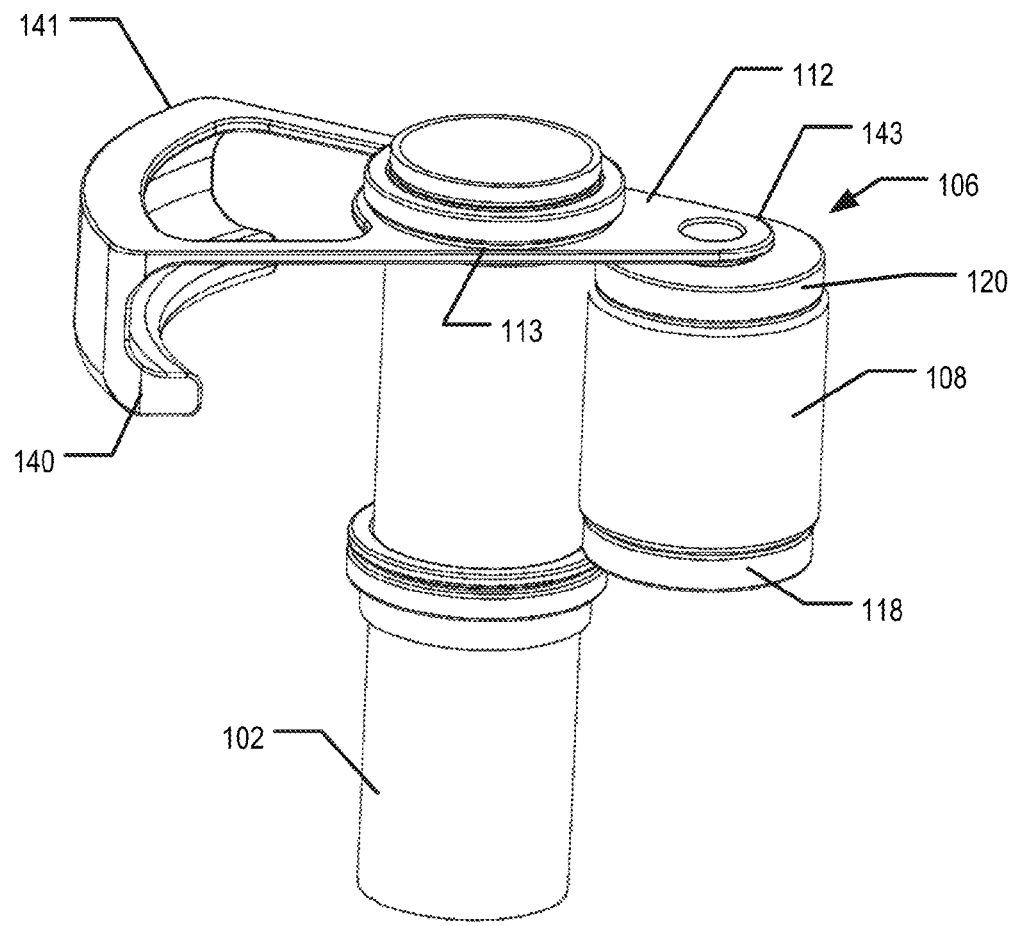
FIG. 2a illustrates a planetary traction drive, including a clutch roller, contacting a drive shaft as well as a counterweight, wherein the planetary traction drive and counterweight are both suspended from a carrier plate.
Figure 2B:
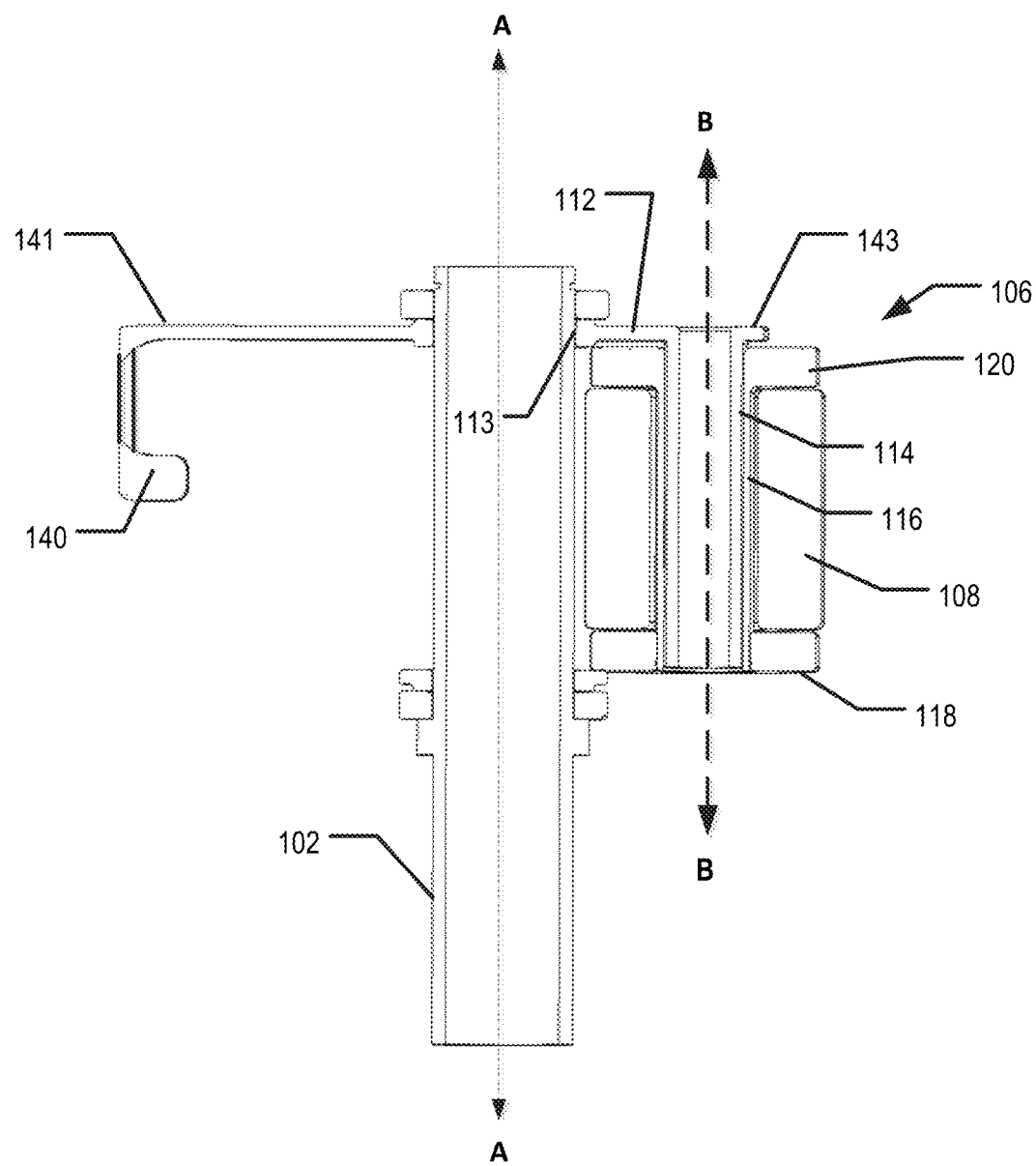
FIG. 2b illustrates a cross-section of the planetary traction drive, including the clutch roller, bushing and planetary shaft extending from the carrier plate, the clutch roller is not illustrated as contacting the drive shaft due to the angle which the cross-section was taken.

The drive shaft 102 cooperates with the planetary traction drive 106, an embodiment of which is illustrated in FIGS. 2a and 2b. Referring to FIG. 2a, the planetary traction drive 106, includes a clutch roller 108, which contacts the drive shaft 102. As the drive shaft 102 rotates around primary axis A-A, it drives the clutch roller 108, which orbits the drive shaft and rotates in the opposite direction of the drive shaft around secondary axis B-B. Secondary axis B-B is parallel to primary axis A-A.

Preferably, the clutch roller is formed from a material that exhibits a durometer in the range of 30 to 100 as measured on the Shore A scale, including all values and ranges therein such as from 70 to 90. In embodiments, the clutch roller is preferably formed of an elastomeric material, such as polysiloxane elastomer, thermoset polyurethane, thermoplastic polyurethane, or other thermoplastic elastomers including, but not limited to diene elastomers, thermoplastic polyester elastomers and polyamide based elastomers; metallic spring elements, such as metal materials that elastically deform upon application of a force; or hybrid metallic/elastomeric elements. The surface of the clutch roller may be roughened or shaped to increase surface friction or the spring force of the clutch roller may be adjusted to satisfy the requirements of the application. The clutch roller may be molded and preferably, in the case of thermoplastic material, is injection molded. The outer surface of the clutch roller may be textured or include surface features to alter the traction of the roller. In preferred embodiments, the clutch roller exhibits a diameter in the range of 20.0 to 50.0 mm, including all values and ranges therein, such as in the range of 20.0 to 40.0 mm, 30.0 mm, 34.1 mm, etc. In addition, in preferred embodiments, the clutch roller exhibits a length in the range of 10.0 mm to 50.0 mm, including all values and ranges therein, such as 30.0 mm to 40.0 mm, 33.9 mm.

The clutch roller 108 is mounted on a planetary shaft 114, wherein the clutch roller 108 surrounds the periphery and, preferably the entire periphery, of the planetary shaft 114. A planetary shaft may be understood as a shaft that orbits the drive shaft during operation of the gear train. The planetary shaft 114 extends from a carrier plate 112, which is rotatably mounted on the drive shaft 102, as illustrated in FIGS. 2a and 2b. The clutch roller 108 may rotate relative to the planetary shaft 114, or the clutch roller 108 may be fixed relative to the planetary shaft 114 and both the clutch roller 108 and planetary shaft 114 may rotate relative to the carrier plate 112. The carrier plate includes a hub 113 through which the drive shaft 102 passes. Accordingly, reference to a carrier plate is understood as a plate, rod, shaft or other object upon which components, such as the planetary shaft 114, are mounted directly or indirectly to the drive shaft 102.

In preferred embodiments, the clutch roller 108 may be mounted on a bushing 116, which is received by and rotates relative to the planetary shaft 114. Again, the clutch roller 108 may surround the bushing 116 and preferably the entire periphery of the bushing 116. A clutch ring 118, 120 is preferably provided at either end of the clutch roller 108. Alternatively, a single clutch ring may be provided at one end of the clutch roller 108. In preferred embodiments, the clutch rings 118, 120 are mounted on the planetary shaft 114 on either side of the clutch roller 108. The clutch rings 118, 120 also rotate around the secondary axis. As illustrated, in FIG. 2b, one of the clutch rings 120 is provided as part of the bushing 116. The diameter of the clutch rings 118, 120 is less than that of the clutch roller 108. In embodiments, the carrier plate 112 and planetary shaft 114 does not force the clutch roller against the drive shaft 102 and it does not act as a bearing surface for the clutch roller 108.

Figure 3A:
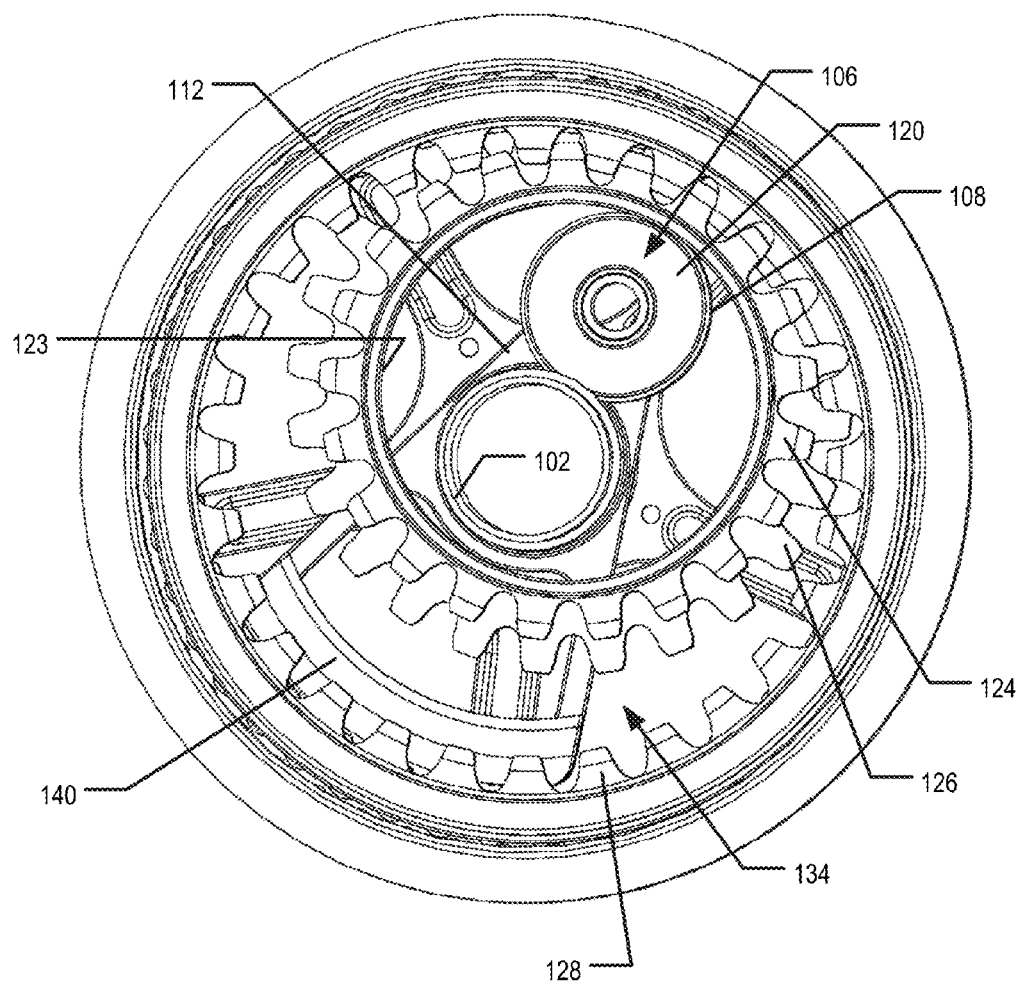
FIG. 3a is a "bottom-up" view of the gear train gears relative to the view of FIG. 1, illustrating first ring gear and first wobble gear.
Figure 3B:
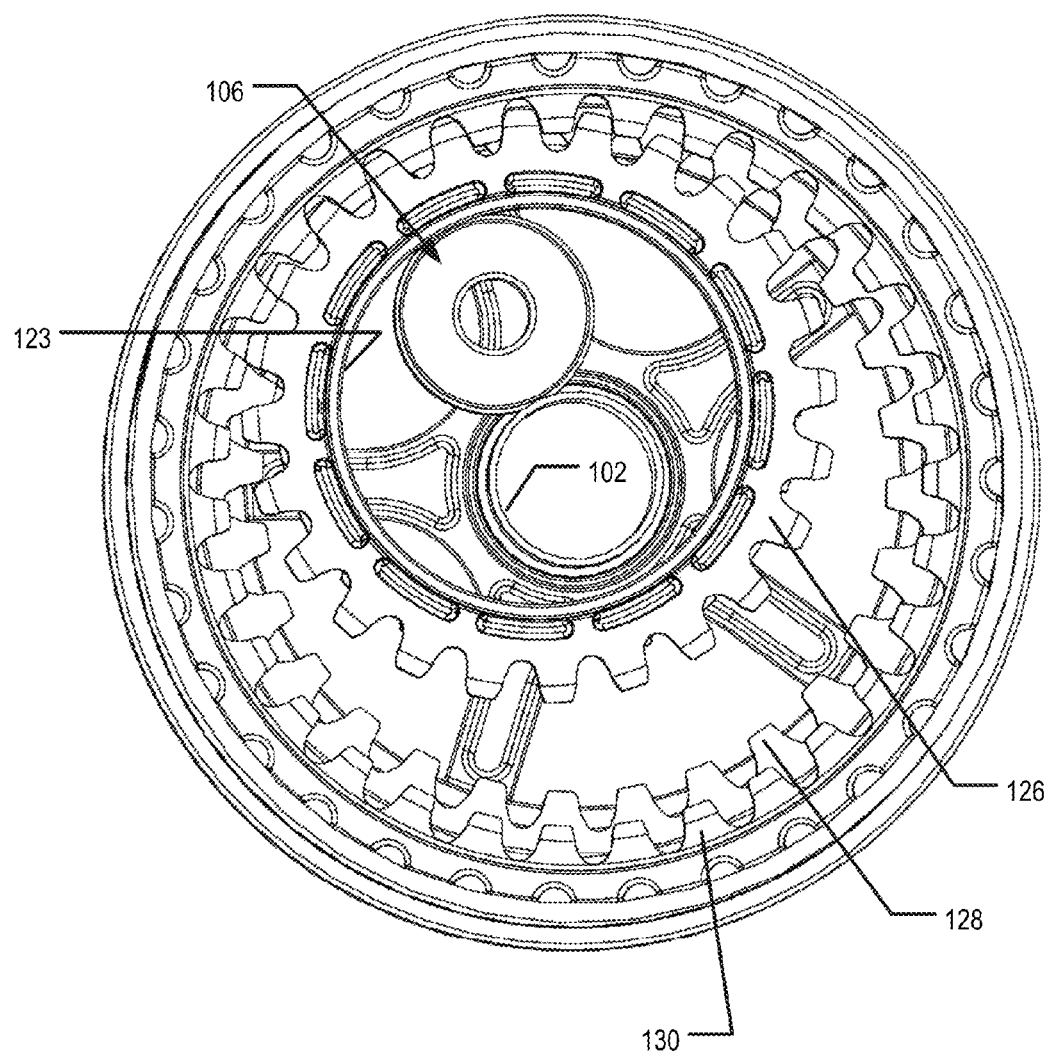
FIG. 3b is a "top-down" view of the gear train gears relative to the view of FIG. 1, illustrating the second ring gear and second wobble gear, the first ring gear is also visible.

Referring now to FIGS. 3a and 3b, clutch roller 108 is directly preloaded against wobble gears 124, 126. A wobble gear is understood as a gear that converts the eccentric, orbital motion of the traction drive to a cycloidal motion. In preferred embodiments, the wobble gears include external teeth, i.e., teeth around the outer periphery of the gear, similar to a pinion. Surrounding the first and second wobble gears 124, 126 are first and second ring gears 128, 130. The ring gears 128, 130 are therefore understood as gears that surround the wobble gears 124, 126 and, in particular embodiments, include teeth on the inner diameter of the gears such as in the case of internal gears.

Alternatively, the gear teeth of the wobble gears and ring gears may be omitted and at least one of the mating pitch circle surfaces of each gear set (wobble and ring) are formed from a material that exhibits a durometer in the range of 30 to 100 as measured on the Shore A scale, including all values and ranges therein such as from 70 to 90. In embodiments, the material is preferably formed of an elastomeric material, such as polysiloxane elastomer, thermoset polyurethane, thermoplastic polyurethane, or other thermoplastic elastomers including but not limited to diene elastomers, thermoplastic polyester elastomers and polyamide based elastomers; metallic spring elements, such as metal materials that elastically deform upon application of a force; or hybrid metallic/elastomeric elements. Traction between the mating surfaces engages the gears and transfers the torque between the gears. Further the outer diameter of the wobble gears and the inner diameter of the ring gears may be textured or include surface features that alter the traction of the gears.

The clutch roller 108, carried by the planetary shaft 114, acts upon an internal diameter 123 of the wobble gears. As the clutch roller 108 orbits around the drive shaft 102, it presses the first and second wobble gears 124, 126 against the first and second ring gears 128, 130, respectively, causing surfaces of the wobble gears and ring gears to mate and engage. If teeth are present, the wobble gears and ring gears mesh when the surfaces mate as illustrated. The second wobble gear 126 may be pressed against the second ring gear 130 directly by the clutch roller 108 or indirectly by the clutch roller 108 through the first wobble gear 124. In embodiments, the inner diameter of the wobble gears may also have features that alter the traction of the clutch roller.

During operation, as torque increases and exceeds the design limit, i.e., exceeds the rated torque, the clutch roller compresses and deforms to the point where the clutch rings 118, 120 contact the wobble gears 124, 126. As the clutch rings 118, 120 are stiffer than the clutch roller and exhibit a lower coefficient of friction, the clutch roller slips, loses contact with wobble gears, and additional torque is not transferred between the drive shaft and the wobble gears. Further, as the torque increases there is a mechanical phase lag between the input shaft angle and the internal gear angle. The degree of lag may be altered by adjusting the material properties of the clutch roller.

Referring back to FIGS. 2a and 2b, the carrier plate 112 is preferably formed of brass. It may be appreciated that other materials may be used as well. In non-limiting embodiments, such materials exhibit a density in the range of 3.0 g/cc to 9.0 g/cc, including all values and ranges therein. Further, the materials exhibit a tensile strength (yield) in the range of 0.3 GPa to 6.0 GPa, including all values and ranges therein, and a modulus of elasticity in the range of 82.0 GPa to 117 GPa, including all values and ranges therein. The carrier plate may be formed by milling or sintering.

The clutch rings and bushing are preferably formed of a thermoplastic material, filled thermoplastic materials and more preferably self-lubricating materials. In preferred embodiments, the clutch rings and bushing are formed of an acetal resin with 10 to 30% by weight polytetrafluoroethylene fibers dispersed therein, such as Delrin AF Blend, available from E. I. du Pont de Nemours. Self-lubricating materials may be understood as materials that transfer microscopic amounts of the material to the surface against which it mates or contacts, which may reduce friction and provide lubrication. The clutch rings preferably exhibit a dynamic (dry vs steel) coefficient of friction in the range of 0.05 to 0.30, including all values and ranges therein, such as 0.15 to 0.25, 0.18 to 0.20, etc., as measured by PTM55007. As noted above, the coefficient of friction of the clutch rings is less than that of the clutch roller. The clutch rings preferably also exhibit a tensile strength (yield) of 0.01 GPa to 6.0 GPa, including all values and ranges therein, and a tensile modulus of elasticity in the range of 1 GPa to 82 GPa, including all values and ranges therein.

Turning again to FIG. 3a, as illustrated, the first wobble gear 124 meshes with the first ring gear 128 as the first wobble gear 124 rotates against the first ring gear 128. At any given time, in the range of one to ten teeth of the first wobble gear 124 are engaged with the teeth of the first ring gear 128. Preferably, the first ring gear 128 is fixed in place around primary axis A-A and, therefore, does not rotate relative to the primary axis. In embodiments, illustrated in FIG. 1, the first ring gear 128 is affixed to a housing 132, which at least partially supports the gear train or the gear train and motor.

Turning to FIG. 3b, the second wobble gear 126, which is driven by the first wobble gear 124, engages and meshes with the second ring gear 130 and causes the second ring gear 130 to rotate around primary axis A-A, albeit at a rate that is relatively slower than the rate of rotation of the drive shaft 102. At any given time, in the range of one to ten teeth of the second wobble gear 126 are engaged with the teeth of the second ring gear 130. In addition, the second ring gear 130 may rotate in the opposite direction around primary axis A-A than the direction the drive shaft 120 rotates.

The first wobble gear 124 and second wobble gear 126 are affixed to each other, such that they rotate together. The first wobble gear 124 and second wobble gear 126 are preferably formed as a single component. Alternatively, the wobble gears may be two individual components that are attached together. As multiple teeth are in contact and enmeshed between the wobble gears and ring gears, the teeth share the load. As the load increases, the strain on the teeth at the center of the mesh may cause the outer teeth to engage, which increases the tooth contact ratio and may also increase the ultimate strength of the gear.

Figure 4A:
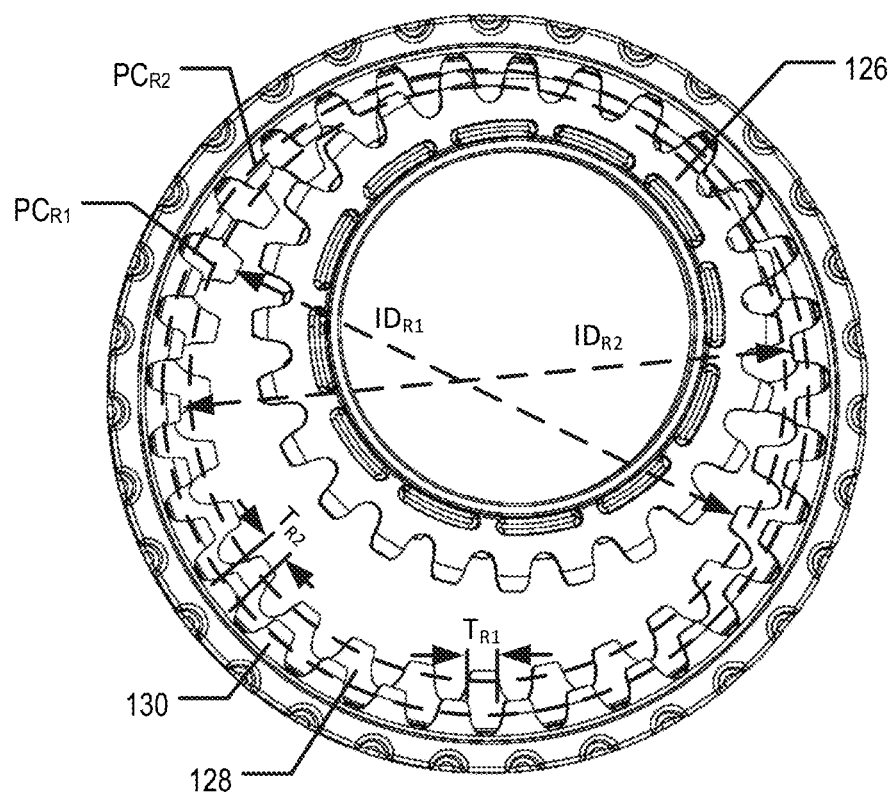
FIG. 4a is a "top-down" view of the gear train gears relative to the view of FIG. 1, illustrating just the ring gears and the wobble gears.
Figure 4B:
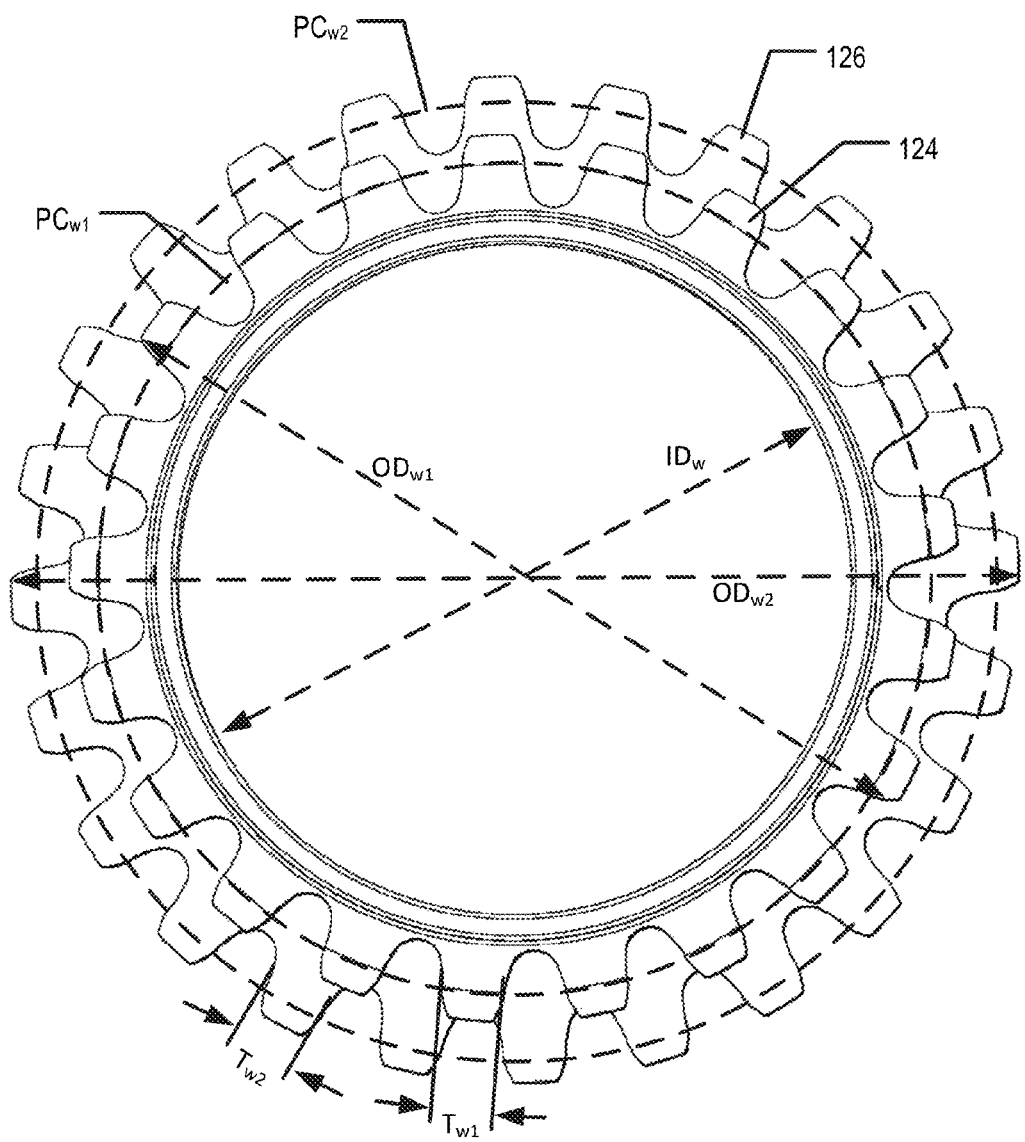
FIG. 4b is a "bottom-up" view of the wobble gear relative to the view of FIG. 1.

As illustrated in FIG. 4a, the inner diameter of the first ring gear 128, $ID_{R1}$, measured from the tips of the teeth, is preferably smaller than the inner diameter of the second ring gear 130, $ID_{R2}$. As illustrated in FIG. 4b, the outer diameter of the first wobble gear 124, $OD_{W1}$, measured from the tips of the teeth, is preferably smaller than the outer diameter of the second wobble gear 126, $OD_{W2}$. The teeth of the wobble gears and ring gears are cycloidal and the radius of the teeth are preferably in the range of 1.0 mm to 14.0 mm, including all values and ranges therein, such as in the range of 4.0 mm to 10.0 mm, 7.0 mm. When the tooth gears mesh an imaginary circle, the pitch circle, can be drawn through the points where the teeth make contact on each gear. The pitch circle of the first ring gear $PC_{R1}$ and second ring gear $PC_{R2}$ are greater in diameter than the pitch circle of first wobble gear $PC_{W1}$ and the second wobble gear $PC_{W2}$.

In preferred embodiments, the first wobble gear preferably includes in the range of 9 to 21 teeth, including all values and ranges therein, the teeth having a width $T_{W1}$ in the range of 12 to 22 mm, including all values and ranges therein, such as 17.5 mm. The second wobble gear preferably includes in the range of 10 to 24 teeth, including all values and ranges therein, the teeth having a width $T_{W2}$ in the range of 9.0 to 19.0 mm including all values and ranges therein such as 16.5 mm. The first wobble gear pitch circle diameter is in the range of 80.0 to 90.0 mm, including all values and ranges therein, such as 84.0 mm, and the second wobble gear pitch circle diameter is in the range of 90.0 to 100.0 mm, including all values and ranges therein, such as 96 mm. The inner diameter of the first wobble gear may be in the range of 20.0 mm to 50.0 mm, including all values and ranges therein such as 30.0 mm to 40.0 mm, 38.0 mm, etc.

Also in preferred embodiments, the first ring gear pitch circle diameter is in the range of 105.0 to 115.0 mm, including all values and ranges therein, such as 110.0 mm to 115 mm, 112.0 mm, etc., and the second ring gear pitch circle diameter is in the range of 120.0 to 130.0 mm, including all values and ranges therein, such as 122.0 mm to 126.0 mm, 124 mm, etc. Further the first ring gear may exhibit in the range of 25 to 35 teeth, including all values and ranges therein, at a tooth width $T_{R1}$ in the range of 12.0 to 22.0 mm, including all values and ranges therein, such as 15.0 mm to 19.0 mm, 17.5 mm, etc. The second ring gear may exhibit in the range of 26 to 36 teeth, including all values and ranges therein, at a tooth width $T_{R2}$ in the range of 9.0 to 19.0 mm, including all values and ranges therein, such as 14.0 mm to 18.0 mm, 16.5 mm, etc. The width of the first and second wobble gear teeth is preferably the same as the width of the first and second ring gear teeth, respectively.

The wobble gears and ring gears may be formed of a thermoplastic material and preferably of a glass or carbon fiber filled polyamide, polyphthalamide, or polyether ether ketone, wherein the filler may be present in the range of 10% to 40% by weight of the total polymer composition. Other materials may be used as an alternative to the filled polyamide, polyphthalamide, or polyether ether ketone such as those exhibiting similar properties to the preferred materials, having a density in the range of 0.5 g/cc to 9.0 g/cc, including all values and ranges therein. The tensile strength (yield) may be in the range of 1 MPa to 400 MPa, including all values and ranges therein and the modulus of elasticity may be in the range of 1 GPa to 50 GPa, including all values and ranges therein. Further, the materials preferably include those that are self-lubricating, i.e., the material transfer microscopic amounts of the material to surfaces against which it mates or contacts, which may reduce friction and provides lubrication. As noted above, when the gears do not include teeth, the gears or at least their mating surfaces, are formed from a material that exhibits a durometer in the range of 30 to 100 as measured on the Shore A scale, including all values and ranges therein such as from 70 to 90. In embodiments, the material is preferably formed of an elastomeric material, such as polysiloxane elastomer, thermoset polyurethane, thermoplastic polyurethane, or other thermoplastic elastomers including but not limited to diene elastomers, thermoplastic polyester elastomers and polyamide based elastomers; metallic spring elements, such as metal materials that elastically deform upon application of a force; or hybrid metallic/elastomeric elements. The gears may be formed by milling or injection molding.

Referring back to FIG. 3a, when the wobble gears 124, 126 roll against the ring gears 128, 130, a gap 134 is present between the wobble gears 124, 126 and ring gears 128, 130 diametrically opposite to the contacting surfaces of the wobble gears 124, 126 and ring gears 128, 130. A counterweight 140 is suspended within this gap 134. Referring again to FIG. 2a, the counterweight 140 is preferably suspended from the same plate 112 from which the clutch roller 108 is suspended. Referring back to FIG. 2b, the counterweight 140 is suspended from a second end 141 of the carrier plate 112, which opposes the first end 143 of the carrier plate that the clutch roller 108 is suspended from. However, a separate plate may alternatively be provided that is fixed relative to the carrier plate 112. In preferred embodiments, the counterweight 140 is formed as part of the carrier plate 112. Alternatively, the counterweight 140 may be a separate component affixed to the carrier plate 112.

In operation, the counterweight 140 orbits the drive shaft 102 at the same rate that the clutch roller 108 orbits around the drive shaft 102. The counterweight 140 balances the two wobble gears to prevent vibration of the gear train. The counterweight 140 is preferably formed from brass or another material that may exhibit similar properties and may be formed using similar processes as those described above with regard to the carrier plate. The counterweight 140 and carrier plate 112 preferably have a mass that appropriately counter balances the wobble gears.

Figure 5A:
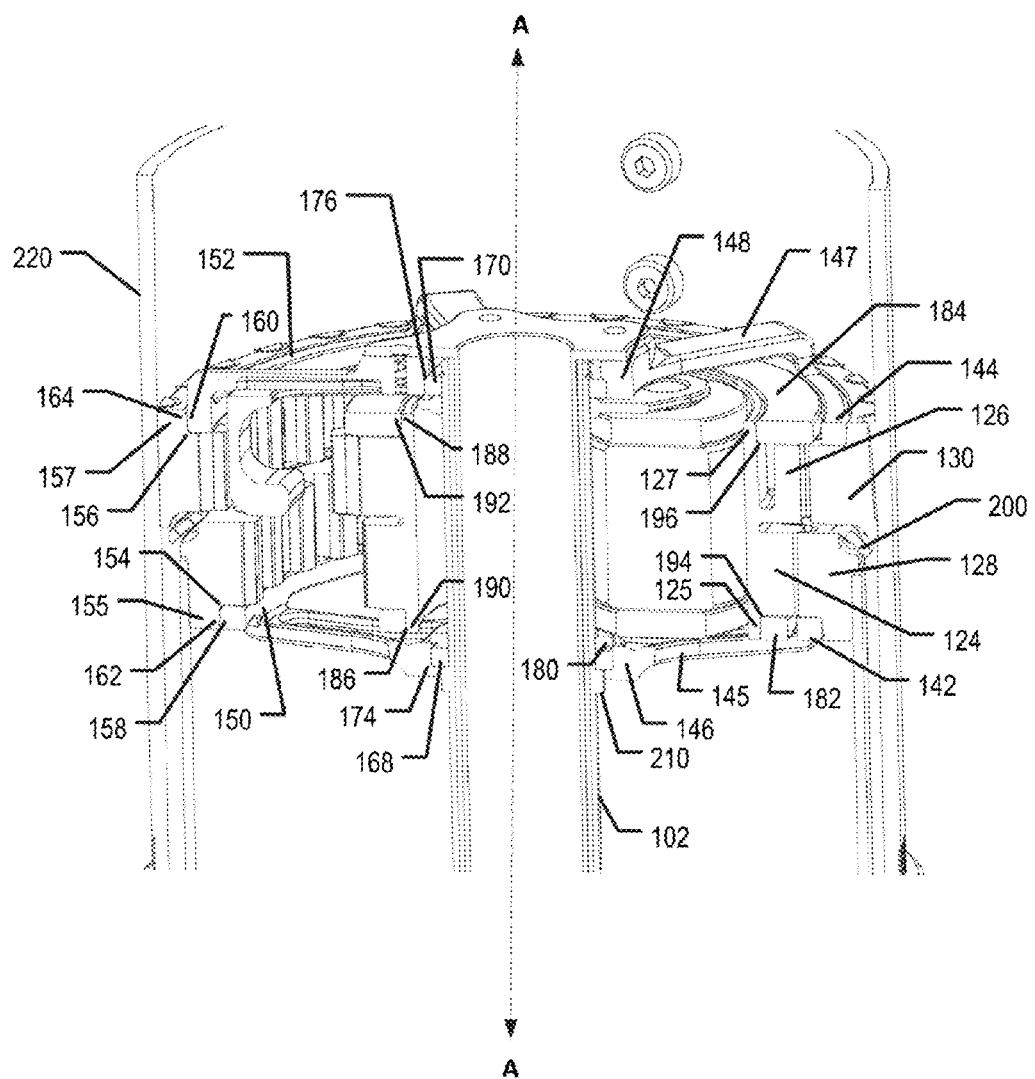
FIG. 5a illustrates a side cross-section of an embodiment of a gear train.
Figure 5B:
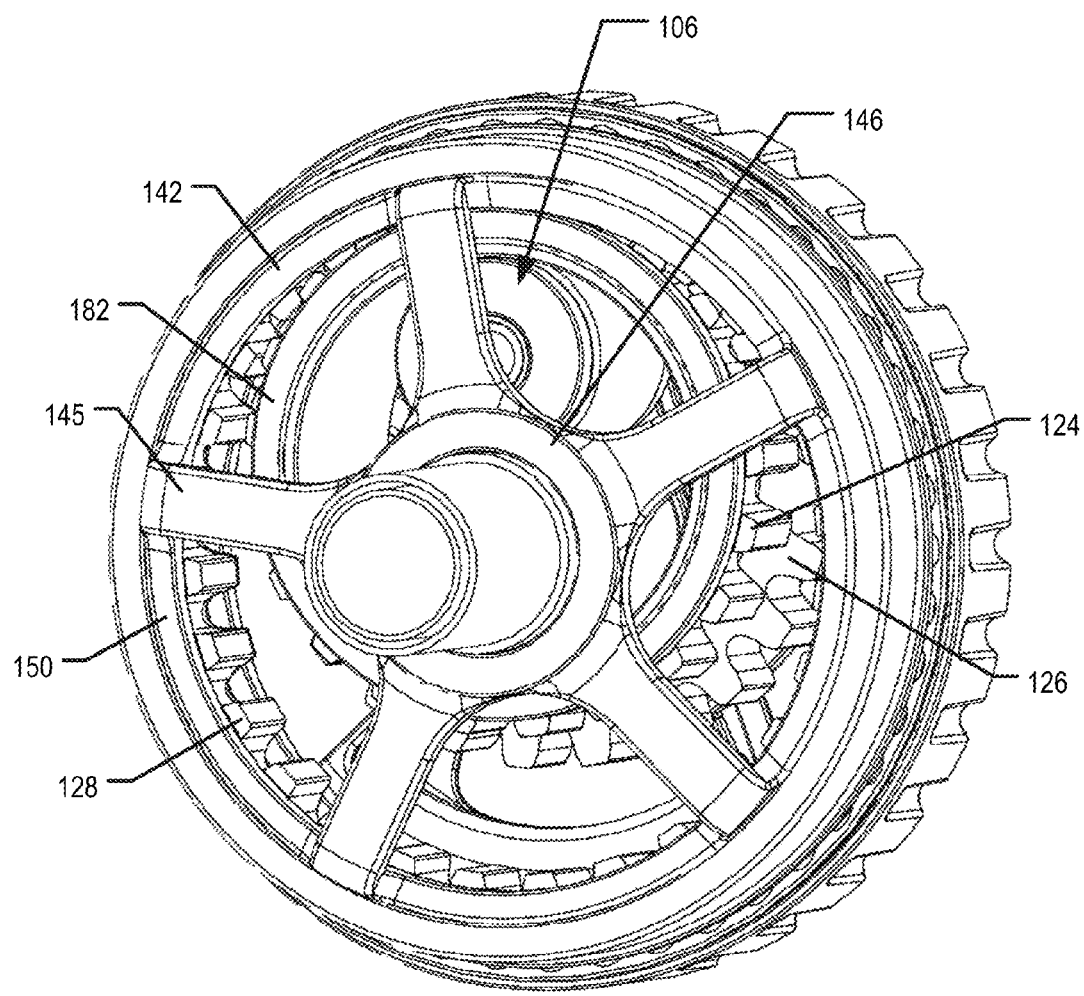
FIG. 5b illustrates a perspective view of the "bottom" of the gear train gears, drive shaft, and first spoke ring, the planetary traction drive and counterweight are also visible.
Figure 5C:
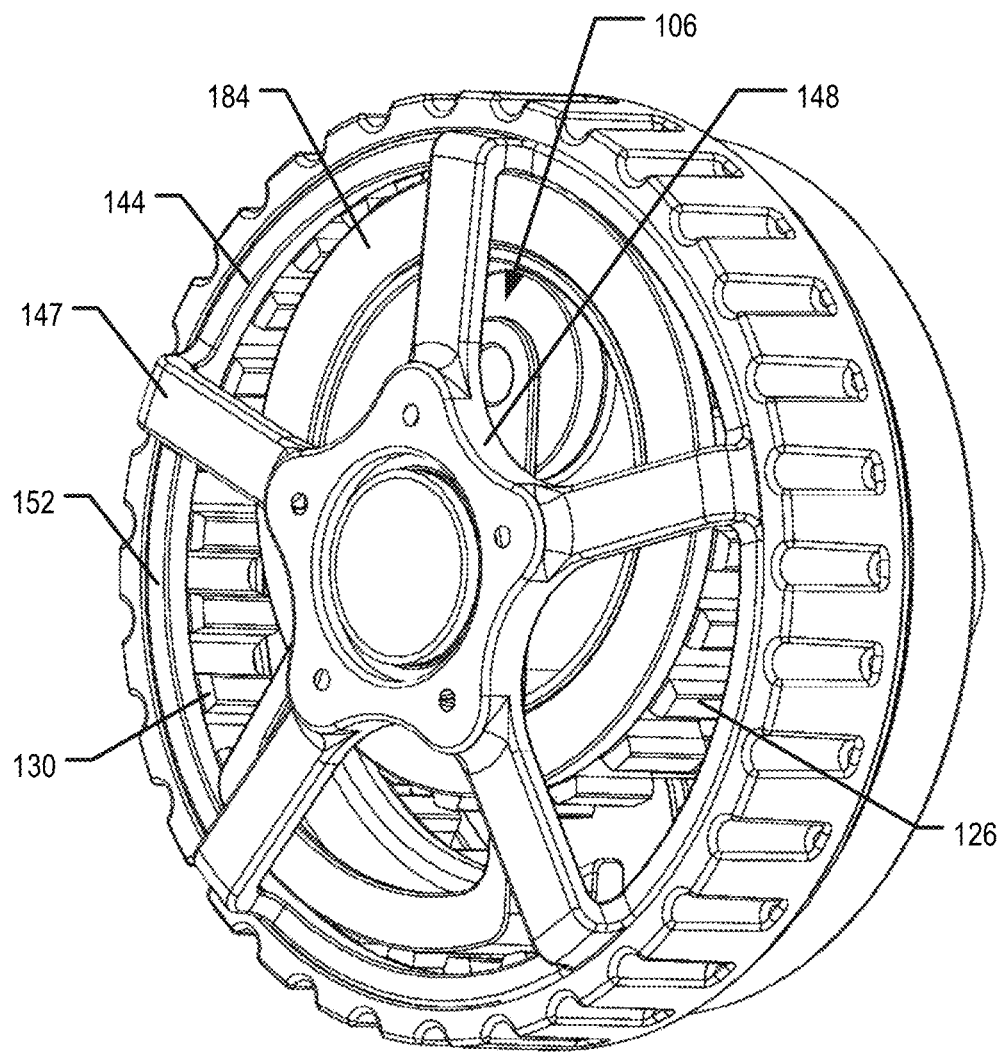
FIG. 5c illustrates a perspective view of the "top" of the gear train gears, drive shaft, and second spoke ring, the planetary traction drive and counterweight are also visible.

Referring to FIGS. 5a, 5b and 5c, seated in each ring gear 128, 130 is preferably a spoke ring 142, 144. The spoke rings 142, 144 are mounted on opposing ends of the ring gears 128, 130. Each spoke ring 142, 144 includes a hub 146, 148 through which the drive shaft 102 passes. The spoke rings 142, 144 also preferably include two or more arms 145, 147 extending between an outer ring 150, 152 and the hub 146, 148. Alternatively, instead of arms, a continuous surface may be provided between the outer ring 150, 152 and the hub 146, 148 forming a cover. Thus a spoke ring as understood herein may include a hub and an outer ring joined together by spokes, arms or a continuous surface. The ring gears 128, 130 each include a shoulder 154, 156, formed by the gear teeth and a cylindrical wall 155, 157 extending, in opposing directions, from each ring gear.

The spoke rings 142, 144 are retained by a friction or interference fit with the ring gears 128, 130. As illustrated in FIG. 5a, the spoke rings 142, 144 preferably each include a tongue 158, 160 extending from the periphery of the outer ring 150, 152 into a groove 162, 164 in the inner surface of the ring gear 128, 130. The tongue and groove prevents displacement of the spoke rings from the ring gears in the lateral direction along axis A-A. Each spoke ring 142, 144 rotates with the ring gear 128, 130 on which it is seated and is fixed relative to its respective ring gear 128, 130. The spoke rings may be formed of a thermoplastic material. Preferably, the spoke rings are formed of acetal or materials similar to those used for the gears and preferably the self-lubricating materials described above. The spoke rings may be injection molded or milled depending on the material chosen. The spoke rings may be fixed/bolted to the ring gears.

In preferred embodiments, bearings 168, 170 are provided between the hub 146, 148 of each spoke ring 142, 144 and the drive shaft 102. The planetary traction drive is mounted on the drive shaft laterally along axis A-A between the bearings 168, 170. The bearings 168, 170 are illustrated as being ring shaped and rest in a shoulder 174, 176 defined by each hub 146, 148, such that the bearings are positioned to the hubs 146, 148 and adjacent to drive shaft. It may be appreciated that a portion of each hub may extend over the bearings towards the drive shaft 102. The bearings may be formed of a magnesium alloys or materials similar to those used for the gears and preferably the self-lubricating materials described above. The bearings may be formed by milling or injection molding, or standard purchased rolling element bearings and bushings.

In addition, one or more spacer rings may be provided. As illustrated, a spacer ring 180 is provided on the opposing side of the planetary traction drive 106 from the plate 112 supporting the planetary traction drive 106. The spacer ring 180 is preferably seated between the bearing 168 and the planetary traction drive 106. As illustrated, the spacer ring is circular with an "L" shaped cross-section. Other cross sectional configurations may alternatively be employed. The spacer rings, like the bearings, may be formed of a magnesium alloy or materials similar to those used for the gears described above. The spacer rings may be formed by milling or injection molding.

In embodiments, a rolling ring 182, 184 is mounted on each wobble gear 124, 126. As the wobble gears 124, 126 mesh with the ring gears 128, 130, the rolling rings 182, 184 make rolling contact the outer rings 150, 152 of the spoke rings 142, 144 promoting smooth rolling of the surface without employing additional ball bearings. The wobble gears preferably each include a hub extending up from the center of the wobble gears 125, 127. The hub and gear teeth of each wobble gear form a shoulder 194, 196 in which the rolling rings 182, 184 may sit. The rolling rings 182, 184 may be held in place on the shoulders of the first and second wobble gears 124, 126 by a tongue 186, 188 extending from the inner surface of each rolling ring and into a groove 190, 192 in each wobble gear 124, 126.

In preferred embodiments, the outer circumference of the rolling rings 182, 184 is concentric with the pitch circle of the wobble gears 124, 126. Alternatively, at least one of the rolling rings extends beyond the pitch circle of the teeth of the wobble gears. In further alternative embodiments, the outer rings 150, 152 of the spoke rings 142, 144 may extend past the pitch circle of the wobble gear, towards the center of the wobble gears. In addition to providing smooth rolling surfaces, the rolling rings and outer spoke rings may aid in keeping the wobble gears properly located relative to the ring gears along the primary axis A-A and maintain pitch centerline of the gears. The rolling rings may be formed of a magnesium alloy or similar materials as the gears described above and may be milled or injection molded.

Figure 6:
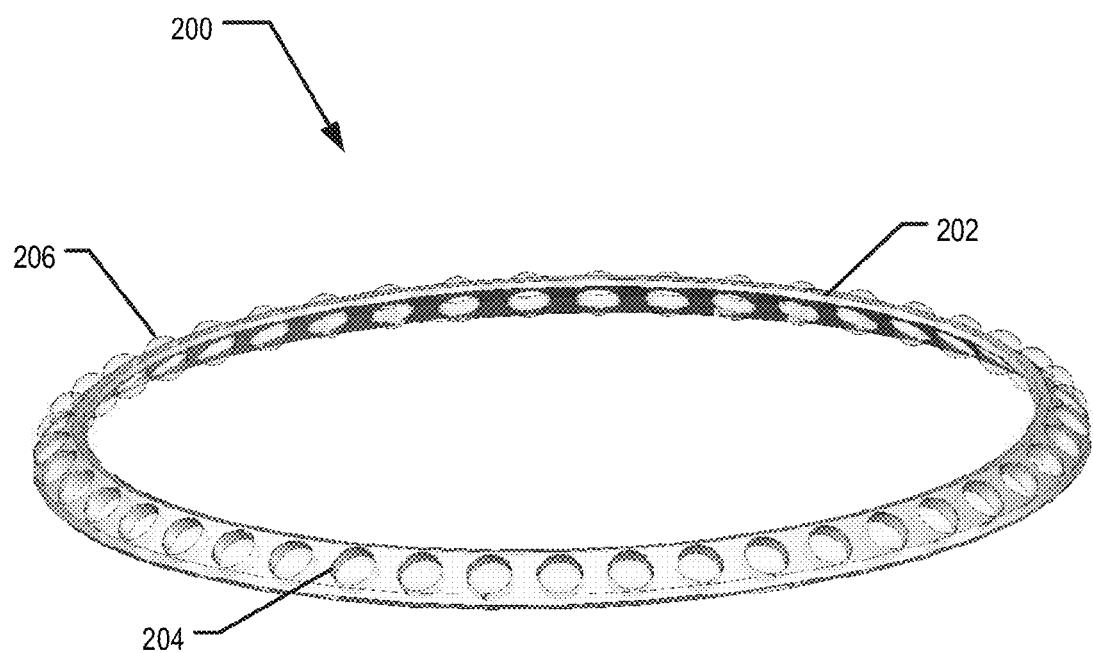
FIG. 6 illustrates a perspective view of an embodiment of the ball bearing positioned between the first ring gear and the second ring gear.

An additional bearing is preferably provided between the first and second ring gears, such as a ball bearing, crossed-roller bearing or bushing. A perspective view of an embodiment of a ball bearing 200 positioned between the gears is illustrated in FIG. 6. The ball bearing 200 includes a retainer 202 having a frusto-conical shape. A number of ball sockets 204, i.e., through holes, are defined in the retainer 202. Received in each ball socket is a bearing ball 206. Referring back to FIG. 3a, the ball bearing 200 may assist rotation of the second ring gear 130 relative to the first ring gear 128.

To aid in supporting or positioning the gears of the gear train, the drive shaft 102 may include a locating shoulder 210 as illustrated in FIG. 5a. The locating shoulder 210 preferably extends around the periphery of the drive shaft 102 and has a larger diameter than the diameter of the drive shaft 102. The lower bearing 168 may be positioned on the locating shoulder 210. The locating shoulder 210 may be formed from the drive shaft or may be formed from another material and positioned over the drive shaft.

Figure 7A:
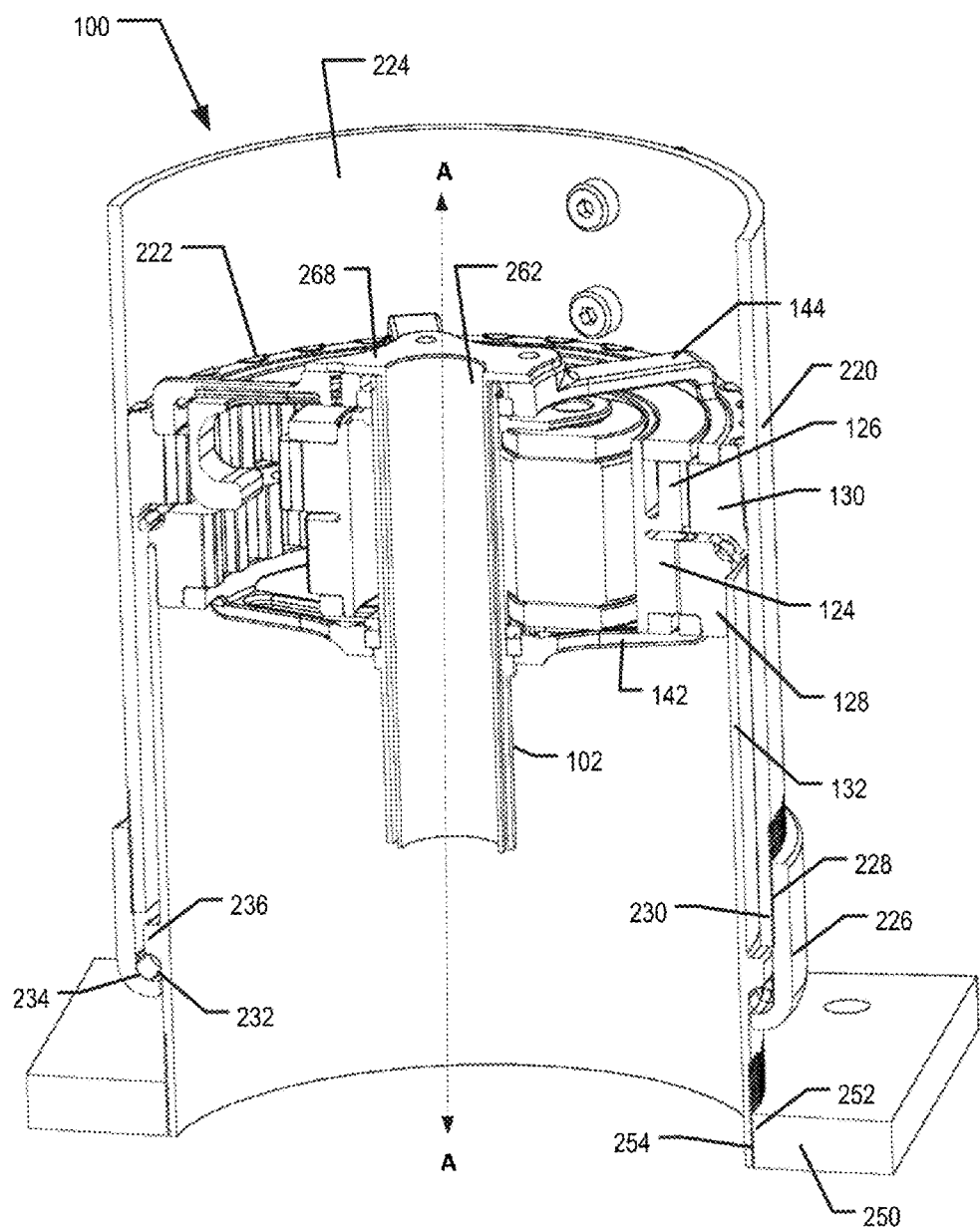
FIG. 7a illustrates a perspective view of an embodiment of a gear train including the housing structure.

As illustrated, the gear train output includes the second ring gear 130, which rotates around primary axis A-A. The output may, therefore, be understood as the ring gear that rotates at the desired gear reduction ratio. The first ring gear does not rotate around the primary axis A-A and is held stationary by the housing 132 being attached to the base plate 250. In other embodiments, the second ring gear 130 may be held stationary and the first ring gear 128 may provide output rotation. It is noted that the ring gears 128, 130 and wobble gears 124, 126 are suspended, at least in part, around the drive shaft 102 by the housing 132. Affixed to the second ring gear 130 is an output shaft 220. As illustrated in FIG. 7*a*, a plurality of teeth 222 extending from an internal surface 224 of the shaft 220 mesh with teeth on the exterior of the second ring gear 130. The output shaft 220 is rotated around the primary axis A-A by the secondary ring gear 130 at a rate that is less than the rate of rotation of the drive shaft 102. It may be appreciated that the shaft may assume other geometries, such as a solid cylinder, etc.

Figure 7B:
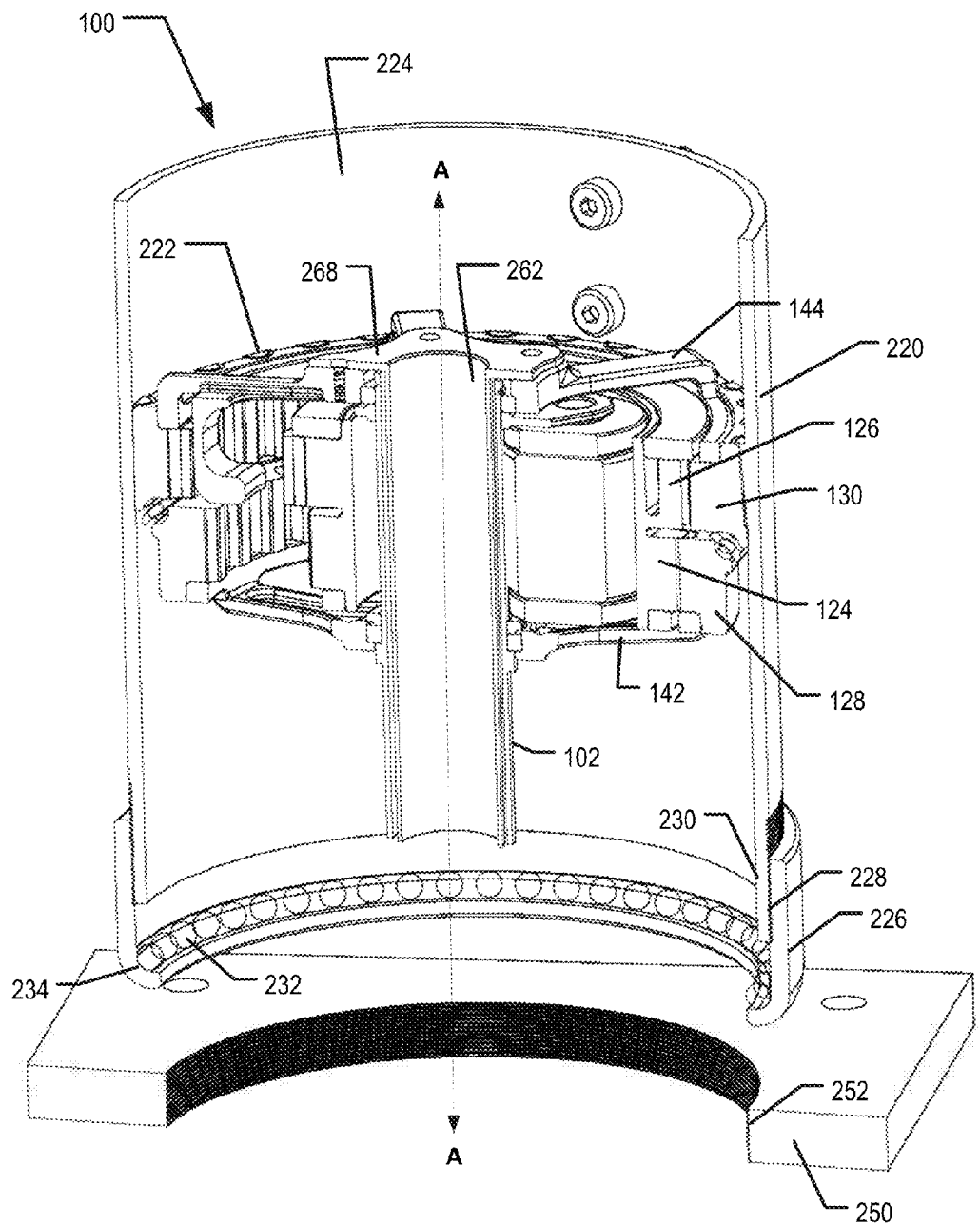
FIG. 7b illustrates a perspective view of the gear train of FIG. 7a without the housing supporting the first ring gear illustrated.

In preferred embodiments, the output shaft 220 and housing 132 form an enclosure for the gear train 100. The output shaft 220 may rotate relative to the housing 132 around primary axis A-A. A collar 226 may be affixed to a lower portion of the output shaft 220, such that it rotates with the shaft and is non-rotatable relative to the shaft. As illustrated, the collar 226 and output shaft 220 include mating threads 228, 230, which are screwed together. Alternatively, other mechanisms of affixing the collar and shaft may be employed, such as welding or adhering the housing and collar together. In preferred embodiments, the collar 226 provides a ball bearing between the output shaft 220 and the housing 132, wherein the bearings 232 are seated between a recess 234 defined in the collar 226 (as seen in FIG. 7*b*) and a locating shoulder 236 extending around the periphery of the housing 132.

Figure 8:
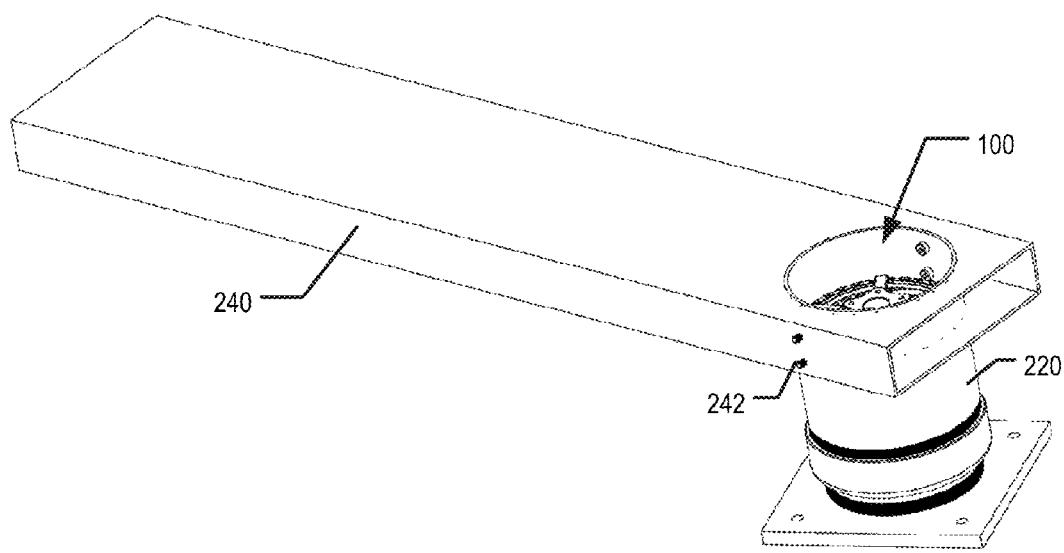
FIG. 8 illustrates an arm extending from the output shaft.

As illustrated in FIG. 8, the output shaft 220 is affixed to a joint arm 240, which assumes a rectangular form, with one or more screws 242 affixing the arm 240 to the output shaft. The arm 240 may alternatively exhibit other configurations and may be affixed to the output shaft 220 using other means, such as by other mechanical fasteners, welding or adhesives. Or, the joint arm 240 may be directly fixed to the second ring gear 130. It may be appreciated that the output shaft 220 may be affixed to other devices as well, including additional gears, forming the joints of robots, assistive devices, prosthetics and other components. The arm may be in the range of 0.01 m (meters) to 2.0 m in length, including all values and ranges therein, such as 0.5 m to 1.5 m in length, 0.75 m to 1.25 m in length, 1.0 m in length, etc.

Referring back to FIG. 7*a*, the housing 132 is mounted on a base 250. Preferably, the housing is fixed in place relative to the base. As illustrated, the column 132 and base 250 include mating threads 252, 254, which are screwed together. Alternatively, other mechanisms of affixing the column 132 and base 250 may be employed, such as welding or adhering the column and collar together. While the base is illustrated as assuming the form of a thick plate, the base may assume other configurations including a cylindrical configuration.

In addition, in any of the above embodiments, an encoder 260 may be provided, such as illustrated in FIG. 1, to determine the absolute or relative location of the output. The encoder may include an encoder shaft 262 that is fixed to the second spoke ring 144 by a plate 268. The encoder 260 may be an absolute or incremental rotary encoder. In addition, the encoder 260 may include an optical or magnetic transducer.

The entire gear train is preferably in the range of 100.0 mm to 200.0 mm in diameter, including all values and ranges therein, such as 125.0 mm to 175.0 mm, 140.0 mm to 150.0 mm, 146.0 mm etc. In addition, the gear train, exclusive of the output shaft and column, is preferably in the range of 75.0 mm to 150.0 mm in length, including all values and ranges therein, such as in the range of 100.0 mm to 120.0 mm, 111.4 mm, etc. Further, the gear train, exclusive of the output shaft and column, exhibits a weight in the range of 0.10 kg to 1.0 kg, including all values and ranges therein, such as 0.40 kg to 0.8 kg, 0.71 kg, etc., depending on materials used in construction.

It may be appreciated that while the gear train above is generally described in a manner that indicates that the first ring gear is fixed in place, as alluded to above, the second ring gear may alternatively be fixed in place. That is, the second ring gear may not rotate relative to the primary axis A-A and the first ring gear may rotate about axis A-A. In such a manner the based may rotate and the joint arm may be fixed. Further, while it is illustrated that the drive shaft extends out from underneath first wobble gear and ring gear along axis A-A, alternatively or additionally, the drive shaft may extend out above the second wobble gear and second ring gear along axis A-A.

Figure 11:
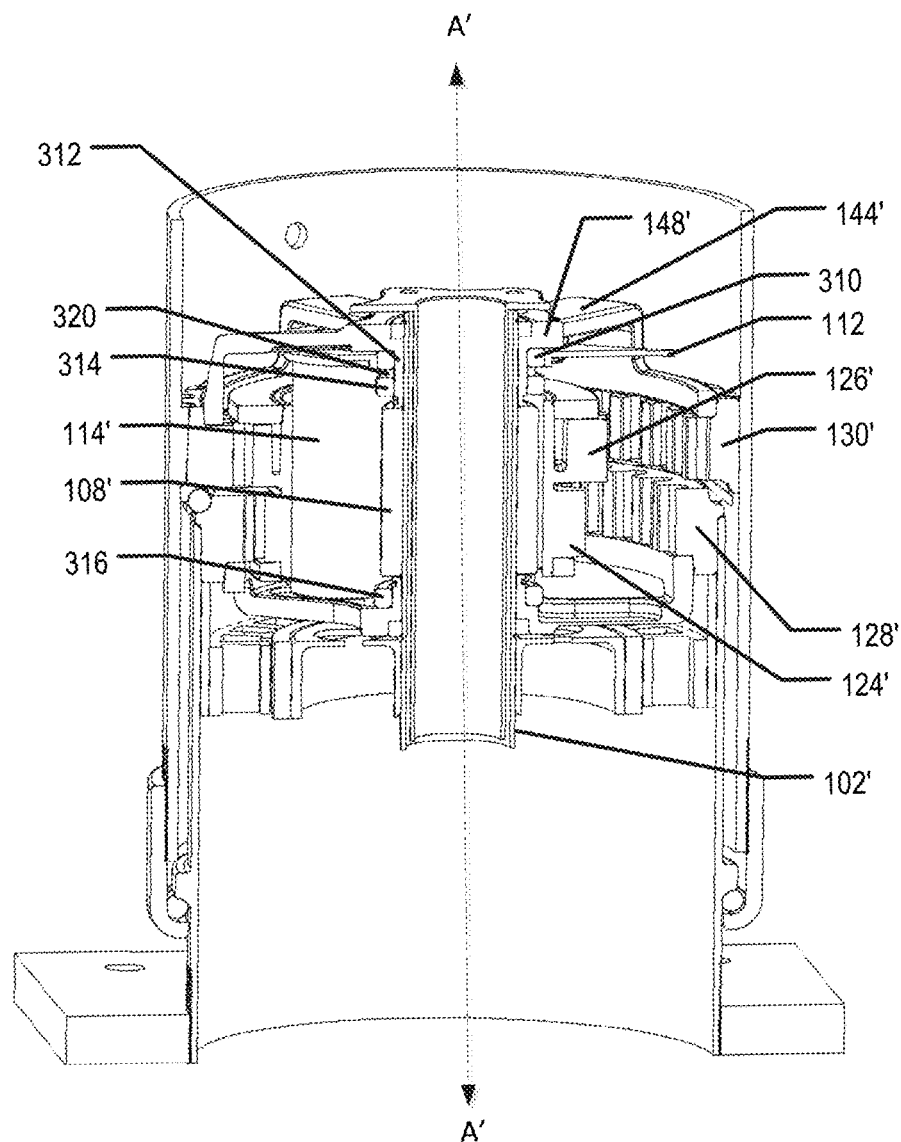
FIG. 11 illustrates a cross-sectional view of an embodiment of a gear train including alterations to the planetary gear design.

It may be appreciated that various alterations may be made to the gear train described above. For example, rather than mounting the clutch roller 108 on the planetary shaft 114 as illustrated in FIGS. 2*a* and 2*b*, the clutch roller 108' may be mounted on drive shaft 102' as illustrated in FIG. 11. The clutch roller may be mounted on the drive shaft in such a manner that it surrounds the periphery of the drive shaft 102' and, preferably, completely surrounds the periphery of the drive shaft 102'. In such an embodiment, the clutch roller 108' rotates with the drive shaft 102' around primary axis A'-A', being rotatably fixed to the drive shaft 102'. The clutch roller 108' is preferably formed of the same or similar materials as those described above. That is, the clutch roller may exhibit a durometer in the range of 30 to 100 as measured on the Shore A scale, including all values and ranges therein such as from 70 to 90. The clutch roller 108' may be press-fit, or may be bonded to the drive shaft 102'. However, for ease of maintenance, mounting the clutch roller 108' by press-fit may be preferred.

Figure 14:
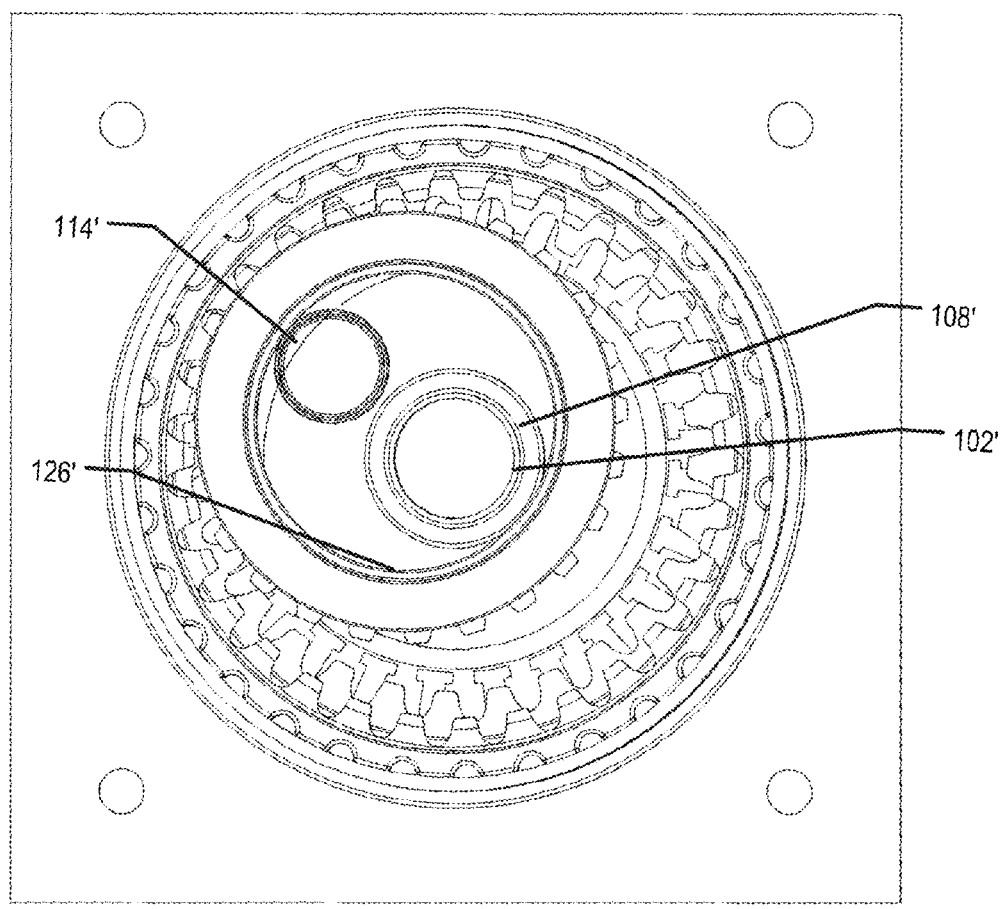
FIG. 14 illustrates a "top" view of the gear train of FIG. 11 illustrating the relationship of the clutch roller, planetary shaft and wobble gears, with the spoke ring, carrier plate, and counter weight removed.

The clutch roller 108' is preloaded against the first wobble gear 124' and second wobble gear 126' as illustrated in FIG. 14, which illustrates the clutch roller 108' mounted on the drive shaft 102'. The clutch roller 108' drives the wobble gears 124', 126', causing the wobble gears 124', 126' to rotate around the drive shaft 102' and primary axis A'-A' in an eccentric manner. The planetary shaft 114' is carried by the carrier plate 112' and orbits around the drive shaft 102'. The planetary shaft 114' keeps the wobble gears 124', 126' engaged with the ring gears 128', 130' as the wobble gears 124', 126' are rotatably driven by the clutch roller 108'. In embodiments, the planetary shaft 114' preferably rotate relative to the carrier plate 112'.

Figure 12:
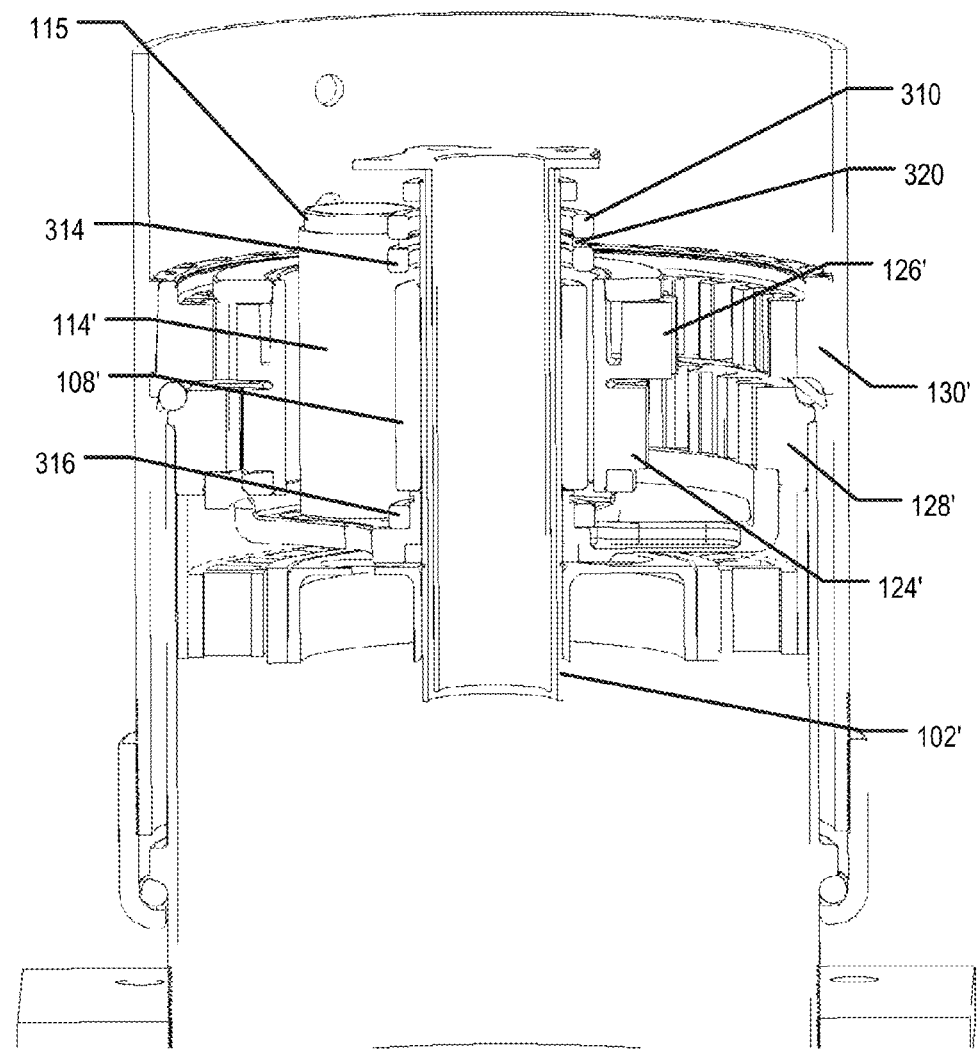
FIG. 12 illustrates a perspective view of a carrier plate with a counterweight extending from one end.
Figure 13:
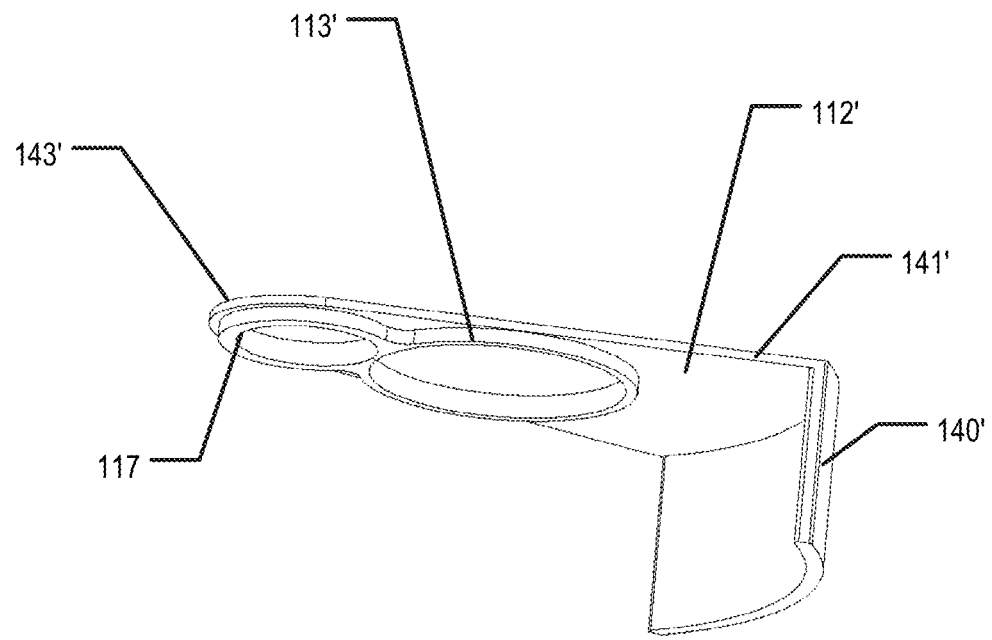
FIG. 13 illustrates a perspective view of the counter weight of the embodiment of a gear train of FIG. 11.

In addition, as illustrated in FIG. 12, the planetary shaft 114' may be larger than the embodiment of FIG. 2*b*, and may include a shoulder 115, created by a step in the planetary shaft 114' outer diameter, that is received in and rides in an opening 117 in the carrier plate 112' illustrated in FIG. 13. The opening 117 may be formed in the first end 143' of the carrier plate and the counterweight 140' may extend from the opposing end 141' of the carrier plate as described above. It may be appreciated that in this alteration, the clutch rings 118, 120 and bushing 116 illustrated in FIG. 2*b* may be eliminated.

Also illustrated in FIG. 11, the carrier plate 112' is mounted onto the second spoke ring 144' rather than positioned directly around the drive shaft 102' as illustrated in FIGS. 2*a* and 2*b*. A carrier plate bearing 310 is preferably positioned between the carrier plate 112' and the second spoke ring 144'. The carrier plate 112' and carrier plate bearing 310 are preferably positioned on a collar 312 extending from the hub 148' of the second spoke ring 144'. Being that the carrier plate 112' is mounted to the second spoke ring 144', the carrier plate 112', the planetary shaft 114', and the counterweight 140' may rotate relative to the second spoke ring 144' such that the planetary shaft 114' and counter weight 140' may orbit the drive shaft 102'.

A first planetary shaft bearing 314 is preferably positioned between the collar 312 extending from the second spoke ring hub 148' and the planetary shaft 114'. A second planetary shaft bearing 316 is preferably positioned between the planetary shaft 114' and a collar 320 extending from the hub 146' of the first spoke ring 142'. The planetary shaft bearings 314, 316 are preferably positioned at, or slightly spaced from, either end of the clutch roller 108' along the length of the drive shaft 102' and exhibit a diameter that is relatively larger than that of the clutch roller 108'. Further, the planetary shaft bearings 314, 316 preferably space the clutch roller 108' from the planetary shaft 114' so that the clutch roller 108' does not contact the planetary shaft 114' during operation. A spacer ring 320 is also preferably placed between the first planetary shaft bearing 314 and the carrier plate bearing 310. The bearings may be formed from the same or similar bearing materials as those described above.

As alluded to above, during operating as torque increases and exceeds the rated or peak torque, the clutch roller compresses and deforms, slipping against the wobble gears. As in the embodiment above, the peak torque may preferably be at least 50 N-m, such as in the range of 50 N-m to 200 N-m (Newton-meters), including all values and ranges therein. This causes the roller to slip and lose contact with the wobble gears 124', 126'. In addition, as torque increases, there may be a mechanical phase lag. Again, the degree of lag may be adjusted by altering the material properties of the clutch roller.

A method of operating a gear train includes rotating a drive shaft around a primary axis at a first rate of rotation. The drive shaft rotates a clutch roller, which is preloaded against first and second wobble gears. The clutch roller drives the first and second wobble gears, which may then rotate in an eccentric manner around the drive shaft. The wobble gears engage a first ring gear and second ring gear and at least one of said ring gears is rotated at a second rate that is less than the first rate of rotation.

A particular method of operation of the gear train includes rotating a drive shaft around a primary axis in a first direction at a first rate, and rotating a clutch roller around a secondary axis in a direction opposite to the first direction. The clutch roller also orbits around the primary axis. Preferably, a counterweight is also orbited around the primary axis with the clutch roller. A first wobble gear engages a first ring gear and a second wobble gear engages a second ring gear, wherein the engagement is caused by preloading of the clutch roller against the first and second wobble gears. Either of the ring gears is rotated in a direction opposite to the first direction and a second rate that is less than the first rate. A joint arm may be affixed directly or indirectly to the rotating gear. Further the other ring gear (not affixed to the joint arm) may be held stationary. The method and additional features of the method are apparent from the description of embodiments of the gear train provided above. For example, if a torque is applied to the output exceeding 50 N-m, the clutch roller slips against the drive shaft. In preferred embodiments if a torque is applied to the output exceeding a torque in the range of 50 to 200 N-m, the clutch roller slips against the drive shaft.

Yet another particular method of operating a gear train includes rotating a drive shaft and a clutch roller mounted on the drive shaft around a primary axis in a first direction at a first rate. A planetary shaft orbits the clutch roller and drive shaft. A first wobble gear engages a first ring gear and a second wobble gear engages a second ring gear, wherein the engagement is maintained by the planetary shaft. Either of the ring gears is rotated at a second rate that is less than the first rate. A joint arm may be affixed directly or indirectly to the rotating ring gear. Further the other ring gear (not affixed to the joint arm) may be held stationary. A counterweight is also orbited around the primary axis with the planetary shaft. The method and additional features of the method are apparent from the description of embodiments of the gear train provided above. For example, if a torque is applied to the output exceeding 50 N-m, the clutch roller slips against the wobble gears. In preferred embodiments if a torque is applied to the output exceeding a peak torque in the range of 50 to 200 N-m, the clutch roller slips against the drive shaft.

Accordingly, provided herein is a gear train that is relatively inexpensive to produce and torque-limited to enable humans and robots to work together. Weight reduction is also achieved to increase robot payload, reduce energy consumption and, or, reduce user fatigue when incorporated into prosthetic and assistive devices. In addition, the gear train provided herein dampens shock loads, which further limits stresses applied to the gear train. Some embodiments will also enable measurement of torque loads and the gear train may be used as a torque sensor.

Example

A gear train was designed with the purpose of exhibiting a 100 N-m peak output torque, 1 rev/sec output speed, and a 1 meter reach. The gear train had a net gear ratio of ~125:1, which is the result of a gear ratio of ~3.9 provided by the first stage and a gear ratio of ~32:1 provided by the second stage. Additional design parameters of the gear train are provided in Table 1 below.

TABLE 1

Design Parameter of the Gear Train

| Design Parameter | Value | Design Parameter | Value |
| --- | --- | --- | --- |
| Transmission Ratio | ~125:1 | Drive Shaft Diameter | 30 mm |
| Peak Output Torque | 100 Nm | Input Speed | 7500 rpm |
| Outer Diameter | 146 mm | Weight (exclusive of housing and column) | 0.711 kg |
| Clutch Roller Diameter | 34.1 mm | Length | 111.4 mm |
| Clutch Roller Width | 33.9 mm | First Wobble Gear Inner Diameter | 38 mm |
| First Wobble Gear number of teeth | 21 | Second Wobble Gear number of teeth | 24 |
| First Wobble Gear Pitch diameter | 84 mm | Second Wobble Gear Pitch diameter | 96 mm |
| First Wobble Gear Tooth Width | 17.5 mm | Second Wobble Gear Tooth Width | 16.5 |
| First Ring Gear Number of Teeth | 29 | Second Ring Gear Number of Teeth | 31 |
| First Ring Gear Pitch Diameter | 112 mm | Second Ring Gear Pitch Diameter | 124 mm |
| First Ring Gear Tooth Width | 17.5 mm | Second Ring Gear Tooth Width | 16.5 mm |

TABLE 1-continued

Design Parameter of the Gear Train

| Design Parameter | Value | Design Parameter | Value |
|---|---|---|---|
| Gear Tooth Type (all gears) | Cycloidal | Cycloid Tooth Radius | 7.0 mm |
| Counterweight Mass | 139.3 grams | | |

Figure 9:
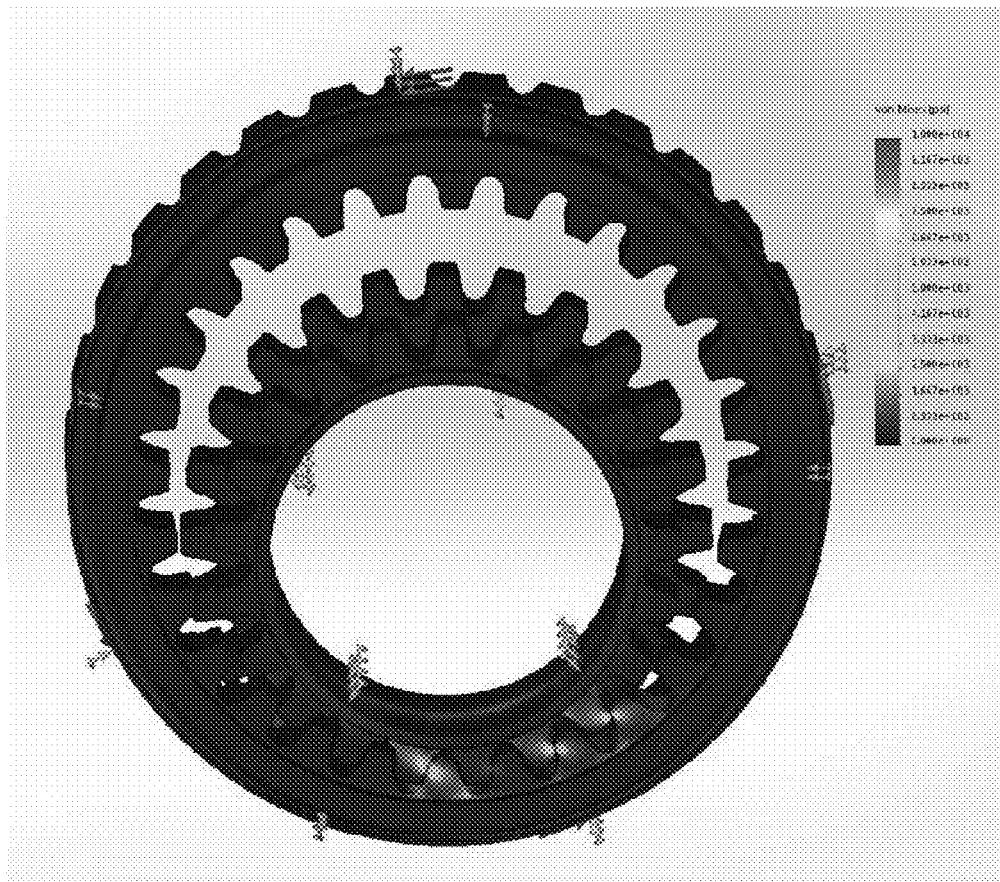
FIG. 9 is an FEA illustrating contact loads between the gear teeth.

Finite element analysis (FEA) was used to test various changes in the tooth stiffness, number of teeth and tooth profile. The design load capacity for the gear train was ~100 N-m, while the weight of the gears (the wobble and ring gears) was kept below 0.40 kg. FIG. 9 shows the finite element analysis of the tooth design illustrating the load being shard across three teeth with a fourth tooth sharing a portion of the load as well. The stress levels are relatively low and the design may be capable of loads higher than 100 N-m.

Finite element analysis using SOLIDWORKS static linear FEA package was conducted. A curve-based mesh was used with the iterative FFEPLUS solver. A custom material with the properties of a carbon fiber reinforced polyphthalamide was used. The properties are provided in Table 2 below.

TABLE 2

Material Properties used for FEA

| Property | Value |
|---|---|
| Elastic Modulus in X | $2.757 \times 10^{10}$ N/m$^2$ |
| Poisson's Ratio in XY | 0.44 |
| Mass Density | 1310.09 kg/m$^3$ |
| Tensile Strength in X | 275790291.8 N/m$^2$ |
| Compressive Strength in X | 344737864.8 N/m$^2$ |
| Yield Strength | 275790291.8 N/m$^2$ |

Figure 10:
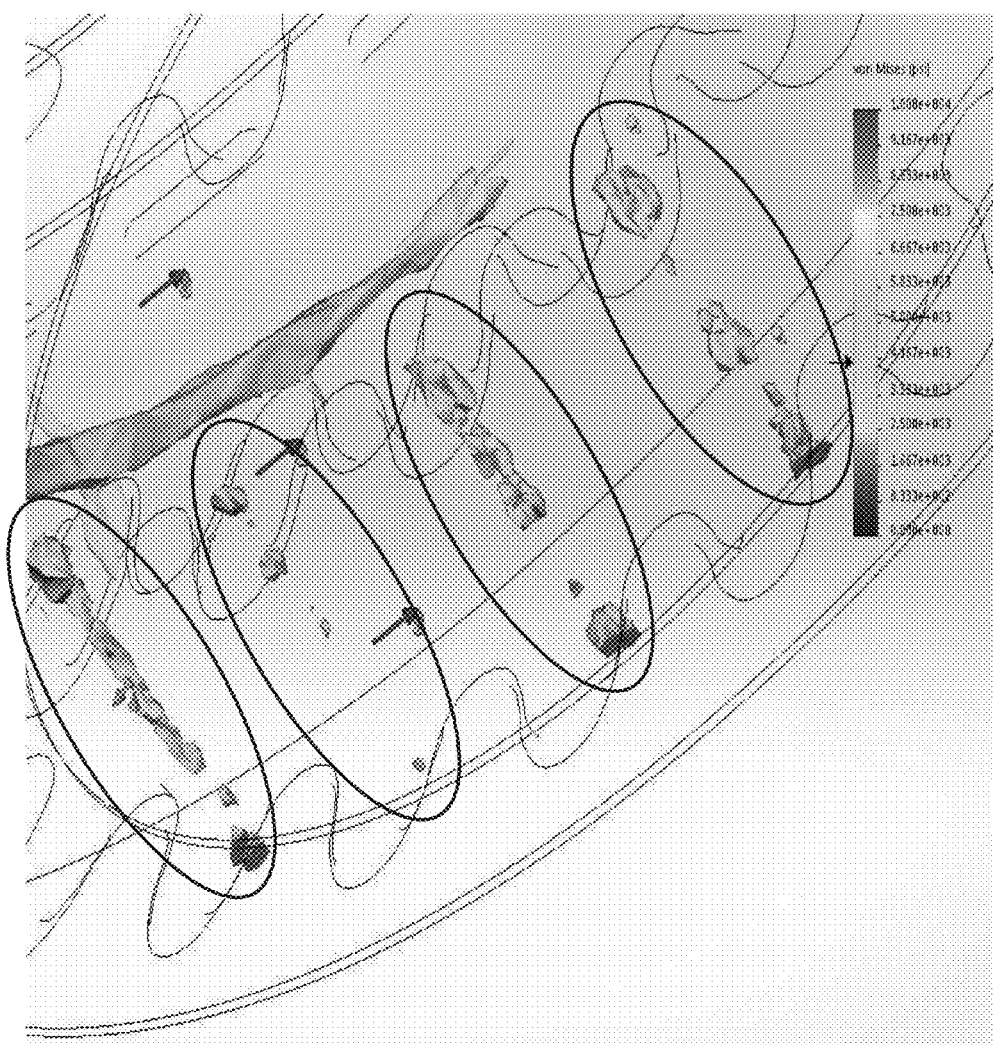
FIG. 10 is an ISO-clipped FEA result illustrating maximum contact stresses between the gear teeth.

FIG. 10 illustrates that the tooth stress is in the range of 4 to 6 ksi at 100 N-m of torque, which is well within the compressive stress capacity of the material. Circled areas show the portions of the teeth exhibiting stress due to loading. The actual capacity of the gear box of the size set forth in Table 1 was found to be in the 150 N-m to 200 N-m range based on the FEA. The FEA was also used to estimate the radial force on the wobble gear to hold it in contact the wobble gears in contact with the ring gears. It was determined that a force in the 60 to 80 pound range, which was used to select clutch roller stiffness, durometer, to hold the gears in contact.

The gear train was fabricated of the following materials and fabrication methods set forth in Table 3 below. The table also provides materials and manufacturing methods contemplated for high volume production of the gear train.

TABLE 3

Gear Train Materials & Fabrication Methods

| Component | First Article Material | First Article Fabrication Method | High Volume Material (future) | High Volume Manufacturing Method (future) |
|---|---|---|---|---|
| Drive Shaft | 6061 T6 Aluminum | CNC lathe turned | 6061 Aluminum T6 | Extruded, ground, grooved |
| Spoke Rings | Acetal, DELRIN (Black) | CNC milled | 30% Carbon Filled PPA or PEEK * | Injection Molded |
| Gears (Wobble and Ring) | Glass-filled Nylon | CNC mill-turned | 30% Carbon Filled PPA or PEEK * | Injection Molded |
| Rolling Rings | Magnesium Alloy | CNC lathe turned | 30% Carbon Filled PPA or PEEK * | Injection Molded |
| Clutch Roller | Two-Component Polyurethane | Molded | Thermoplastic Polyurethane | Injection Molded |
| Clutch Rings | 20% Teflon Fiber filled Acetal, DELRIN AF (Gray) | CNC milled | 20% Teflon Fiber filled Acetal, DELRIN AF (Gray) | Injection Molded |
| Counterweight | Brass | CNC milled | Brass | Sintered |
| Housings | Magnesium Alloy | CNC lathe turned | Magnesium Alloy | Extruded |

* PPA—polyphthalamide, polyether ether ketone

It was confirmed upon building the gear train described in Table 1 that if the output shaft is prevented from turning, the urethane roller spins against the drive shaft, providing the intended clutching action. Further, it was observed that the clutch roller deformation results in mechanical phase lag between the drive shaft angle and the wobble gear angle as torque increased. This provides "springy" impedance at the drive shaft. A stiffer elastomer may reduce this affect.

For purposes of simplicity and clarity of illustration, where considered appropriate, reference numbers are repeated among the figures to indicate corresponding, analogous, or like features. In addition, reference to "top", "bottom", "upper", "lower", etc. are presented for purposes of illustration. In practice, the gear trains described herein may be presented in any number of configurations, such that what may be described as being "upper" herein may be presented, in application, as being "lower", and so on.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A gear train comprising:
 a rotatable drive shaft;
 a clutch roller in rotatable contact with said drive shaft or mounted on said drive shaft;
 a first wobble gear and a second wobble gear suspended around said drive shaft, wherein said first wobble gear is affixed to said second wobble gear and said clutch roller is biased against said first and second wobble gears;
 a first ring gear surrounding and engaged by said first wobble gear;
 a second ring gear surrounding and engaged by said second wobble gear; and
 a gap present between said first and second wobble gears and said first and second ring gears and a counterweight suspended in said gap;
 wherein said drive shaft rotates said clutch roller and said clutch roller drives said first wobble gear and said second wobble gear, such that said wobble gears rotate around said drive shaft and at least one of said first ring gear and said second ring gear rotates around said drive shaft, and
 wherein said clutch roller deforms and slips upon application of a torque to said clutch roller greater than a rated torque.

2. The gear train of claim 1, wherein said rated torque is in the range of 50 N-m to 200 N-m.

3. The gear train of claim 1, wherein said clutch roller exhibits a durometer in the range of 60 to 100 on the Shore A scale.

4. The gear train of claim 1, further comprising a carrier plate including a hub through which said drive shaft passes through, wherein said clutch roller is carried by a first end of said carrier plate and said counterweight is suspended from a second end of said carrier plate.

5. The gear train of claim 1, further comprising a carrier plate including a hub through which said drive shaft passes through, wherein a planetary shaft is carried by a first end of said carrier plate and said counterweight is suspended from a second end of said carrier plate and said planetary shaft maintains engagement of said first wobble gear and said second wobble gear with said first ring gear and said second ring gear.

6. The gear train of claim 1, further comprising a first rolling ring mounted on said first wobble gear and a first spoke ring seated in said first ring gear, wherein said first rolling ring is configured to make rolling contact with said first spoke ring.

7. The gear train of claim 1, further comprising a second rolling ring mounted on said second wobble gear and a second spoke ring seated in said second ring gear, wherein said second rolling ring is configured to make rolling contact with said second spoke ring.

8. The gear train of claim 1, further comprising a first bearing mounted on said drive shaft and a second bearing mounted on said drive shaft, wherein said clutch roller is mounted on said drive shaft between said bearings.

9. The gear train of claim 1, further comprising at least one clutch ring positioned at an end of said clutch roller, wherein said clutch roller exhibits a first diameter and said clutch ring exhibits a second diameter that is less than said first diameter.

10. The gear train of claim 1, further comprising a bearing positioned between said first ring gear and said second ring gear.

11. The gear train of claim 1, wherein said rotatable drive shaft is rotatable at a first rate and at least one of said first ring gear and said second ring gear is rotatable around said drive shaft at a second rate that is less than said first rate.

12. The gear train of claim 1, wherein said clutch roller is in rotatable contact with said drive shaft, said clutch roller engages said first wobble gear with said first ring gear and said second wobble gear with said second ring gear, and said clutch roller deforms and slips relative to at least one of said rotatable drive shaft and said wobble gears upon application of said torque to said clutch roller greater than said rated torque.

13. The gear train of claim 12, wherein said rotatable drive shaft is configured to rotate at a first rate in a first direction, said clutch roller is configured to orbit around said primary axis and rotate around a secondary axis parallel to said primary axis; and wherein one of said first ring gear and said second ring gear is configured to rotate around said primary axis at a second rate that is less than said first rate and in an opposite direction to said first direction.

14. The gear train of claim 1, wherein said clutch roller is mounted to said drive shaft, and said gear train further comprises a planetary shaft that maintains engagement of said first and second wobble gears with said first and second ring gears, and wherein said clutch roller deforms and slips relative to at least one of said wobble gears upon application of said torque to said clutch roller greater than said rated torque.

15. A method of operating a gear train comprising:
 rotating a drive shaft around a primary axis in a first direction at a first rate of rotation;
 rotating a clutch roller with said drive shaft, wherein said clutch roller is biased against a first wobble gear and a second wobble gear, and said clutch roller orbits around said primary axis and rotates around a secondary axis in a direction opposite to said first direction;
 driving said first wobble gear and said second wobble gear with said clutch roller, rotating said wobble gears in an eccentric manner around said drive shaft, wherein said first wobble gear engages a first ring gear and said second wobble gear engages a second ring gear;
 rotating at least one of said first ring gear and said second ring gear around said primary axis at a second rate of rotation that is less than said first rate of rotation; and
 wherein upon application of said torque to said clutch roller greater than a rated torque said clutch roller deforms and slips relative to at least one of said drive shaft and said wobble gears.

16. The method of claim 15, wherein the other of said first and second ring gears is configured to remain stationary and not rotate around said primary axis.

17. The method of claim 15, wherein said clutch roller exhibits a durometer in the range of 60 to 100 on the Shore A scale.

18. The method of claim 15, wherein said rated torque is in the range of 50 N-m to 200 N-m.

19. A gear train comprising: a rotatable drive shaft;
 a clutch roller in rotatable contact with said drive shaft;
 a first wobble gear and a second wobble gear suspended around said drive shaft, wherein said first wobble gear is affixed to said second wobble gear and said clutch roller is biased against said first and second wobble gears;
 a first ring gear surrounding and engaged by said first wobble gear; and a second ring gear surrounding and engaged by said second wobble gear;

wherein said drive shaft rotates said clutch roller and said clutch roller engages said first wobble gear with said first ring gear, engages said second wobble gear with said second ring gear, and drives said first wobble gear and said second wobble gear, such that said wobble gears rotate around said drive shaft and at least one of said first ring gear and said second ring gear rotates around said drive shaft, and said clutch roller deforms and slips relative to at least one of said rotatable drive shaft and said wobble gears upon application of said torque to said clutch roller greater than said rated torque.

20. The gear train of claim 19, wherein said rated torque is in the range of 50 N-m to 200 N-m.

21. The gear train of claim 19, wherein said clutch roller exhibits a durometer in the range of 60 to 100 on the Shore A scale.

22. The gear train of claim 19, further comprising a gap present between said first and second wobble gears and said first and second ring gears and a counterweight suspended in said gap.

23. The gear train of claim 22, further comprising a carrier plate including a hub through which said drive shaft passes through, wherein said clutch roller is carried by a first end of said carrier plate and said counterweight is suspended from a second end of said carrier plate.

24. The gear train of claim 22, further comprising a carrier plate including a hub through which said drive shaft passes through, wherein a planetary shaft is carried by a first end of said carrier plate and said counterweight is suspended from a second end of said carrier plate and said planetary shaft maintains engagement of said first wobble gear and said second wobble gear with said first ring gear and said second ring gear.

25. The gear train of claim 19, further comprising a first rolling ring mounted on said first wobble gear and a first spoke ring seated in said first ring gear, wherein said first rolling ring is configured to make rolling contact with said first spoke ring.

26. The gear train of claim 19, further comprising a second rolling ring mounted on said second wobble gear and a second spoke ring seated in said second ring gear, wherein said second rolling ring is configured to make rolling contact with said second spoke ring.

27. The gear train of claim 19, further comprising a first bearing mounted on said drive shaft and a second bearing mounted on said drive shaft, wherein said clutch roller is mounted on said drive shaft between said bearings.

28. The gear train of claim 19, further comprising at least one clutch ring positioned at an end of said clutch roller, wherein said clutch roller exhibits a first diameter and said clutch ring exhibits a second diameter that is less than said first diameter.

29. The gear train of claim 19, further comprising a bearing positioned between said first ring gear and said second ring gear.

30. The gear train of claim 19, wherein said rotatable drive shaft is rotatable at a first rate and at least one of said first ring gear and said second ring gear is rotatable around said drive shaft at a second rate that is less than said first rate.

31. The gear train of claim 19, wherein said rotatable drive shaft is configured to rotate at a first rate in a first direction, said clutch roller is configured to orbit around said primary axis and rotate around a secondary axis parallel to said primary axis; and wherein one of said first ring gear and said second ring gear is configured to rotate around said primary axis at a second rate that is less than said first rate and in an opposite direction to said first direction.

32. A gear train comprising:
a rotatable drive shaft;
a clutch roller mounted on said drive shaft;
a first wobble gear and a second wobble gear suspended around said drive shaft, wherein said first wobble gear is affixed to said second wobble gear and said clutch roller is biased against said first and second wobble gears;
a first ring gear surrounding and engaged by said first wobble gear; and
a second ring gear surrounding and engaged by said second wobble gear;
a planetary shaft that maintains engagement of said first and second wobble gears with said first and second ring gears,
wherein said drive shaft rotates said clutch roller and said clutch roller drives said first wobble gear and said second wobble gear, such that said wobble gears rotate around said drive shaft and at least one of said first ring gear and said second ring gear rotates around said drive shaft, and
wherein said clutch roller deforms and slips relative to at least one of said first and second wobble gears upon application of a torque to said clutch roller greater than a rated torque.

33. The gear train of claim 32, wherein said rated torque is in the range of 50 N-m to 200 N-m.

34. The gear train of claim 32, wherein said clutch roller exhibits a durometer in the range of 60 to 100 on the Shore A scale.

35. The gear train of claim 32, further comprising a gap present between said first and second wobble gears and said first and second ring gears and a counterweight suspended in said gap.

36. The gear train of claim 35, further comprising a carrier plate including a hub through which said drive shaft passes through, wherein said clutch roller is carried by a first end of said carrier plate and said counterweight is suspended from a second end of said carrier plate.

37. The gear train of claim 35, further comprising a carrier plate including a hub through which said drive shaft passes through, wherein a planetary shaft is carried by a first end of said carrier plate and said counterweight is suspended from a second end of said carrier plate and said planetary shaft maintains engagement of said first wobble gear and said second wobble gear with said first ring gear and said second ring gear.

38. The gear train of claim 32, further comprising a first rolling ring mounted on said first wobble gear and a first spoke ring seated in said first ring gear, wherein said first rolling ring is configured to make rolling contact with said first spoke ring.

39. The gear train of claim 32, further comprising a second rolling ring mounted on said second wobble gear and a second spoke ring seated in said second ring gear, wherein said second rolling ring is configured to make rolling contact with said second spoke ring.

40. The gear train of claim 32, further comprising a first bearing mounted on said drive shaft and a second bearing mounted on said drive shaft, wherein said clutch roller is mounted on said drive shaft between said bearings.

41. The gear train of claim 32, further comprising at least one clutch ring positioned at an end of said clutch roller, wherein said clutch roller exhibits a first diameter and said clutch ring exhibits a second diameter that is less than said first diameter.

42. The gear train of claim 32, further comprising a bearing positioned between said first ring gear and said second ring gear.

43. The gear train of claim 32, wherein said rotatable drive shaft is rotatable at a first rate and at least one of said first ring gear and said second ring gear is rotatable around said drive shaft at a second rate that is less than said first rate.

44. A method of operating a gear train comprising:
   rotating a drive shaft around a primary axis at a first rate of rotation; rotating a clutch roller mounted on said drive shaft around said primary axis, wherein said clutch roller is biased against a first wobble gear and a second wobble gear;
   driving said first wobble gear and said second wobble gear with said clutch roller, rotating said wobble gears in an eccentric manner around said drive shaft, wherein said first wobble gear engages a first ring gear and said second wobble gear engages a second ring gear;
   orbiting a planetary shaft around said drive shaft to maintain engagement of said first wobble gear and said second wobble gear with said first ring gear and said second ring gear;
   rotating at least one of said first ring gear and said second ring gear around said primary axis at a second rate of rotation that is less than said first rate of rotation, wherein said clutch roller deforms and slips relative to said wobble gears upon application of a torque to said clutch roller greater than a rated torque.

45. The method of claim 44, wherein the other of said first and second ring gears is configured to remain stationary and not rotate around said primary axis.

46. The method of claim 44, wherein said clutch roller exhibits a durometer in the range of 60 to 100 on the Shore A scale.

47. The method of claim 44, wherein said rated torque is in the range of 50 N-m to 200 N-m.

* * * * *